(12) United States Patent
Wang et al.

(10) Patent No.: US 8,019,170 B2
(45) Date of Patent: Sep. 13, 2011

(54) VIDEO FRAME MOTION-BASED AUTOMATIC REGION-OF-INTEREST DETECTION

(75) Inventors: Haohong Wang, San Jose, CA (US); Shuxue Quan, San Diego, CA (US); Khaled Helmi El-Maleh, San Marcos, CA (US); Chinchuan Andrew Chiu, San Diego, CA (US); Xiaoyun Jiang, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 908 days.

(21) Appl. No.: 11/364,285

(22) Filed: Feb. 28, 2006

(65) Prior Publication Data

US 2007/0076957 A1 Apr. 5, 2007

Related U.S. Application Data

(60) Provisional application No. 60/724,130, filed on Oct. 5, 2005.

(51) Int. Cl.
*G06K 9/36* (2006.01)
*G06K 9/00* (2006.01)
*H04N 11/02* (2006.01)

(52) U.S. Cl. ... 382/239; 382/164; 382/166; 375/240.02; 375/240.08; 348/404.1

(58) Field of Classification Search ............ 375/240.01–240.29; 382/232–239, 248–253; 348/403.1–407.1, 416.1, 420.1–422.1
See application file for complete search history.

(56) References Cited

U.S. PATENT DOCUMENTS

| 4,203,671 A | 5/1980 | Takahashi et al. |
| 5,043,804 A | 8/1991 | Sugiura |
| 5,150,432 A * | 9/1992 | Ueno et al. ............. 382/250 |
| 5,729,295 A | 3/1998 | Okada |

(Continued)

FOREIGN PATENT DOCUMENTS

AU 739936 B2 10/2001

(Continued)

OTHER PUBLICATIONS

Porikli, F. (Sep. 2003) "Inter-camera color calibration by correlation model function." Proc. 2003 Int'l Conf. on Image Processing, vol. 2 pp. 133-136.*

(Continued)

*Primary Examiner* — Brian P Werner
*Assistant Examiner* — Barry Drennan
(74) *Attorney, Agent, or Firm* — Kevin T. Cheatham

(57) ABSTRACT

The disclosure is directed to techniques for region-of-interest (ROI) video processing based on low-complexity automatic ROI detection within video frames of video sequences. The low-complexity automatic ROI detection may be based on characteristics of video sensors within video communication devices. In other cases, the low-complexity automatic ROI detection may be based on motion information for a video frame and a different video frame of the video sequence. The disclosed techniques include a video processing technique capable of tuning and enhancing video sensor calibration, camera processing, ROI detection, and ROI video processing within a video communication device based on characteristics of a specific video sensor. The disclosed techniques also include a sensor-based ROI detection technique that uses video sensor statistics and camera processing side-information to improve ROI detection accuracy. The disclosed techniques also include a motion-based ROI detection technique that uses motion information obtained during motion estimation in video processing.

39 Claims, 14 Drawing Sheets

U.S. PATENT DOCUMENTS

| | | | | |
|---|---|---|---|---|
| 5,852,669 | A | * | 12/1998 | Eleftheriadis et al. ........ 382/118 |
| 5,903,673 | A | * | 5/1999 | Wang et al. ................... 382/236 |
| 5,907,361 | A | | 5/1999 | Okada |
| 6,026,183 | A | * | 2/2000 | Talluri et al. .................. 382/194 |
| 6,256,423 | B1 | | 7/2001 | Krishnamurthy et al. |
| 6,275,614 | B1 | | 8/2001 | Krishnamurthy et al. |
| 6,445,810 | B2 | | 9/2002 | Darrell et al. |
| 6,678,407 | B1 | | 1/2004 | Tajima |
| 6,739,767 | B2 | | 5/2004 | Ikeda et al. |
| 6,952,225 | B1 | | 10/2005 | Hyodo et al. |
| 2002/0141640 | A1 | | 10/2002 | Kraft |
| 2003/0185438 | A1 | | 10/2003 | Osawa et al. |
| 2004/0095477 | A1 | | 5/2004 | Maki et al. |
| 2005/0012817 | A1 | | 1/2005 | Hampapur et al. |
| 2006/0204113 | A1 | | 9/2006 | Wang et al. |
| 2006/0215752 | A1 | | 9/2006 | Lee et al. |
| 2006/0215753 | A1 | | 9/2006 | Lee et al. |
| 2006/0215766 | A1 | | 9/2006 | Wang et al. |
| 2006/0238444 | A1 | | 10/2006 | Wang et al. |
| 2006/0238445 | A1 | | 10/2006 | Wang et al. |
| 2007/0043527 | A1 | | 2/2007 | Quan et al. |
| 2007/0076947 | A1 | | 4/2007 | Wang et al. |
| 2007/0076957 | A1 | | 4/2007 | Wang et al. |
| 2007/0104472 | A1 | | 5/2007 | Quan et al. |
| 2007/0183661 | A1 | | 8/2007 | El-Maleh et al. |
| 2007/0183662 | A1 | | 8/2007 | Wang et al. |
| 2007/0183663 | A1 | | 8/2007 | Wang et al. |
| 2008/0152245 | A1 | | 6/2008 | El-Maleh et al. |

FOREIGN PATENT DOCUMENTS

| | | |
|---|---|---|
| CN | 1307710 | 8/2001 |
| EP | 0635981 A1 | 1/1995 |
| EP | 1353516 A | 10/2003 |
| EP | 1542155 A1 | 6/2005 |
| JP | 08181992 | 7/1996 |
| JP | 9322176 A | 12/1997 |
| JP | 2003085583 A | 3/2003 |
| JP | 2004021977 | 1/2004 |
| JP | 2004072655 A | 3/2004 |
| JP | 2004219277 A | 8/2004 |
| JP | 2004240844 A | 8/2004 |
| JP | 2005242582 A | 9/2005 |
| KR | 20010053063 | 6/2001 |
| WO | 99/23600 A | 5/1999 |
| WO | 99/67738 A | 12/1999 |
| WO | 00/00932 A | 1/2000 |
| WO | WO2004044830 A1 | 5/2004 |

OTHER PUBLICATIONS

Butler et al. (Dec. 2003) "Robust face localisation using motion, colour, and fusion." Proc. 7$^{th}$ Int'l Conf. on Digital Image Computing: Techniques and Applications, pp. 899-908.*

Wang et al. (Aug. 1997) "A highly efficient system for automatic face region detection in MPEG video." IEEE Trans. on Circuits and Systems for Video Technology, vol. 7 Issue 4, pp. 615-628.*

International Search Report WO 2007/044672 A3 for PCT/US2006/039407.*

Dogan, S. et al., "Fast Region of Interest Selection in the Transform Domain for Video Transcoding," Proc. of the 6th Intl. Workshop on Image Analysis for Multimedia Interactive Services, WIAMIS' 2005, Apr. 13, 2005, pp. 1-4.

Lin, C.-W. et al., "Low-complexity face-assisted video coding," 2000 Intl. Conf. on Image Processing, IEEE, pp. 10-13, Sep. 10-13, 2000.

Lin, C.-W. et al., "A standard-compliant virtual meeting system with active video object tracking," EURASIP Journal of Applied Signal Processing, 6(3): 622-634, 2002.

Yunlong, Z. et al., "Automatic tracking of face sequences in MPEG Video," Proc. of Computer Graphics International, IEEE, pp. 152-157, Jul. 9-11, 2003.

Lee. R. L., "Colorimetric calibration of a video digitizing system: Algorithm and applications," Color Res. Appl., 13(3): 180-186, 1988.

Schumeyer, R. P. et al., "A color-based classifier for region identification in video," Proc. of the SPIE, pp. 189-200, Jan. 28, 1998.

Schumeyer, R. & Barner, K., "Color-based content coding with applications to sign language video communications," Retrieved from the Internet: URL: http://citeseer.ist.psu.edu/1091.html>[retrieved on Jun. 20, 2007], pp. 1-27, 1997.

Angelopoulou, et al., "The Reflectance Spectrum of Human Skin, Technical Report MS-CIS-99-29," GRASP Laboratory Department of Computer and Information Science Technical Report, University of Pennsylvania, Dec. 20, 1999, pp 1-15.

Powell M. W., at al., "Ivanov, K; A methodology for extracting objective color from images," Systems, Man, and Cybernetics, Part B, IEEE Transactions, Oct. 2004, vol. 34, No 5, 1964-1978.

Written Opinion—PCT/US061039407, International Search Authority, European Patent Office, Jul. 3, 2007.

Translation of Office Action in Japanese application 2008-534758 corresponding to U.S. Appl. No. 11/364,285, citing BUTLER_Robust_face_pgs_899_908_year_2003, Wang_A_highly_efficient_pp_615_628_year_1997, JP2003085583A, JP2004240844A, JP08181992, JP2004219277, WO2004044830, JP2004072655 and JP9322176 dated Jan. 4, 2011.

* cited by examiner

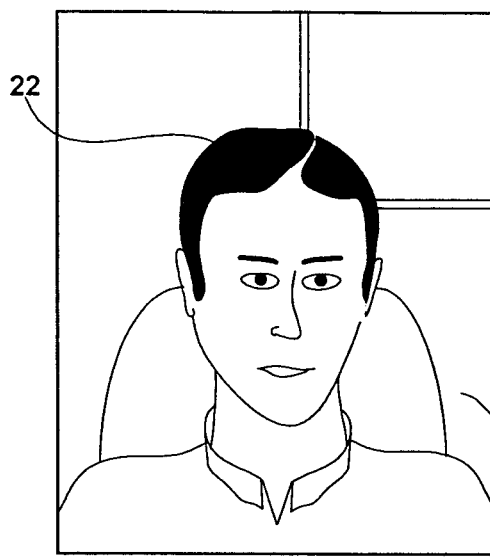
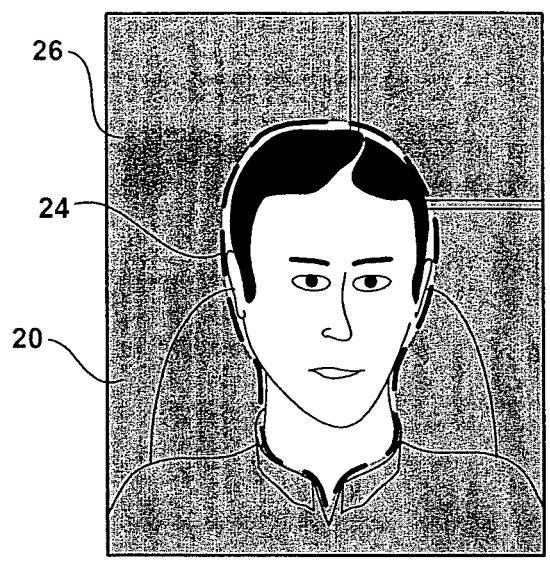
FIG. 2A  FIG. 2B

(a) Original image (frame #134)

(b) Skin map resulted from sensor-oriented skin detection (c) Facial feature candidates after feature detection (d) Facial feature candidates after feature verification (e) Selected ROI region (f) ROI region after morphological operations (g) Resulted ROI macroblocks

VIDEO FRAME MOTION-BASED AUTOMATIC REGION-OF-INTEREST DETECTION

This application claims the benefit of U.S. Provisional Application No. 60/724,130, filed Oct. 5, 2005.

TECHNICAL FIELD

The disclosure relates to region-of-interest (ROI) detection within video frames and, more particularly, techniques for automatically detecting ROIs within video frames for multimedia applications.

BACKGROUND

Automatic region-of-interest (ROI) detection within video frames of a video sequence may be used in ROI video processing systems for a wide range of multimedia applications, such as video surveillance, video broadcasting, and video telephony (VT) applications. In some cases, a ROI video processing system may be a ROI video coding system. In other cases, a ROI video processing system may comprise a ROI video enhancing system or another type of video processing system. A ROI may be referred to as a "foreground" area within a video frame and non-ROI areas may be referred to as "background" areas within the video frame. A typical example of a ROI is a human face. A ROI video processing system may preferentially utilize a ROI detected from a video frame of a video sequence relative to non-ROI areas of within the video frame.

In the case of a ROI video coding system, preferential encoding of a selected portion within a video frame of a video sequence has been proposed. For example, an automatically detected ROI within the video frame may be encoded with higher quality for transmission to a recipient in a video telephony (VT) application. In very low bit-rate applications, such as mobile VT, ROI preferential encoding may improve the subjective quality of the encoded video sequence. With preferential encoding of the ROI, a recipient is able to view the ROI more clearly than non-ROI regions. A ROI of a video frame may be preferentially encoded by allocating a greater proportion of encoding bits to the ROI than to non-ROI, or background, areas of a video frame. Skipping of a non-ROI area of a video frame permits conservation of encoding bits for allocation to the ROI. The encoded non-ROI area for a preceding frame can be substituted for the skipped non-ROI area in a current frame.

Video frames received from a video capture device are typically processed before being applied to an ROI-enabled video encoder, an ROI-enabled video enhancer, or a similar multimedia device. For example, a video processing scheme may automatically detect a ROI within the video frames. Conventionally, a major hurdle preventing rapid progress and wide deployment of ROI-enabled video communication systems is robustness of the automatic ROI detection. Some automatic ROI detection schemes propose a simple skin-tone based approach for face detection that detects pixels having skin-color appearances based on skin-tone maps derived from the chrominance component of an input video image. Other schemes propose a lighting compensation model to correct color bias for face detection. Additionally, automatic ROI detection schemes may construct eye, mouth, and boundary maps to verify the face candidates or use eigenmasks that have large magnitudes at important facial features of a human face to improve ROI detection accuracy.

SUMMARY

In general, the disclosure is directed to techniques for region-of-interest (ROI) video processing based on low-complexity automatic ROI detection within video frames of video sequences. The low-complexity automatic ROI detection may be based on characteristics of video sensors within video communication devices. For example, a video sensor may reside within a so-called camera phone or video phone. In other cases, the low-complexity automatic ROI detection may be based on motion information for a video frame of a video sequence and a different video frame of the video sequence. The techniques may be useful in video telephony (VT) applications such as video streaming and videoconferencing, and especially useful in low bit-rate wireless communication applications, such as mobile VT.

ROI video processing involves preferential processing of the ROI. For example, an ROI video coding algorithm may allocate additional coding bits to a ROI within a video frame, and allocate a reduced number of coding bits to non-ROI areas within a video frame. A typical example of a ROI is a human face. The non-ROI areas may be referred to as "background" areas, although a non-ROI area more generally encompasses any area of a video frame that does not form part of the ROI. Accordingly, the terms "non-ROI" and "background" may be used interchangeably throughout this disclosure to refer to areas that are not within the ROI.

The disclosed techniques include a video processing technique capable of tuning and enhancing video sensor calibration, camera processing, ROI detection, and ROI video processing within a video communication device based on characteristics of a specific video sensor. The video processing technique may be universally applicable to different types of video sensors. In addition, the technique enables flexible communication and cooperation among the components within the video communication device. In this way, the disclosed techniques may enhance ROI video processing performance based on physical characteristics and statistics associated with the video sensor.

The disclosed techniques also include a sensor-based ROI detection technique that uses video sensor statistics and camera processing side-information to improve ROI detection accuracy, which directly enhances ROI video processing performance. For example, a skin region detector uses video sensor statistics to accurately detect a skin map within a video frame, and a face detector uses the skin map to detect one or more faces within the video frame. The disclosed techniques also include a motion-based ROI detection technique that uses motion information obtained during motion estimation in video processing. For example, a face detector uses a skin map and the motion information, e.g., motion vectors, to perform low-complexity face detection that efficiently extracts one or more faces, i.e., ROIs, within the skin map based on the motion information.

The automatic ROI detection techniques may then generate ROIs for each of the faces detected within the video frame. The disclosed techniques apply the video frames including the generated ROIs to ROI video processing. For example, the techniques may apply the video frames to a ROI video coding algorithm that uses weighted bit allocation and adaptive background skipping to provide superior coding efficiency.

In one embodiment, the disclosure provides a method comprising receiving a skin map of a video frame of a video sequence and receiving motion information for the video frame and a different video frame of the video sequence. The method also comprises automatically detecting a ROI within the video frame based on locations of macroblocks in the video frame relative to the skin map of the video frame and a ROI within the different video frame.

In another embodiment, the disclosure provides a computer readable medium comprising instructions that cause the programmable processor to receive a skin map of a video frame of a video sequence and receive motion information for the video frame and a different video frame of the video sequence. The instructions also cause the programmable processor to automatically detect a ROI within the video frame based on locations of macroblocks in the video frame relative to the skin map of the video frame and a ROI within the different video frame.

In a further embodiment, the disclosure provides a video processing system comprising a skin region detector that generates a skin map of a video frame of a video sequence and a ROI video processing module that generates motion information for the video frame and a different video frame of the video sequence. The system also includes a ROI detector that receives the skin map and the motion information for the video frame and automatically detects the ROI within the video frame based on locations of macroblocks in the video frame relative to the skin map of the video frame and a ROI within the different video frame.

The techniques described herein may be implemented in hardware, software, firmware, or any combination thereof. If implemented in software, the techniques may be realized in part by a computer readable medium comprising program code containing instructions that, when executed by a programmable processor, performs one or more of the methods described herein.

The details of one or more embodiments are set forth in the accompanying drawings and the description below. Other features, objects, and advantages will be apparent from the description and drawings, and from the claims.

BRIEF DESCRIPTION OF DRAWINGS

FIGS. 2A and 2B are diagrams illustrating definition of a ROI and a non-ROI area within a video frame of a video sequence.

DETAILED DESCRIPTION

Figure 1:
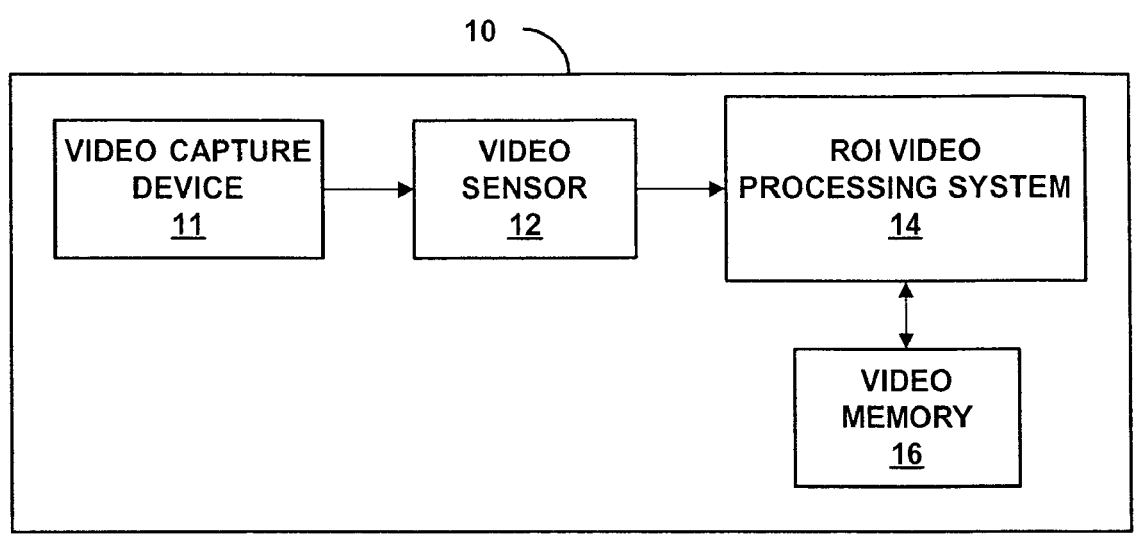
FIG. 1 is a block diagram illustrating an exemplary video communication device incorporating a region-of-interest (ROI) video processing system.

FIG. 1 is a block diagram illustrating an exemplary video communication device 10 incorporating a region-of-interest (ROI) video processing system 14. ROI video processing system 14 implements techniques for low-complexity ROI video processing based on characteristics of a video sensor 12. In other cases, ROI video processing system 14 may also implement techniques for low-complexity ROI video processing based on motion information for a video frame. As shown in FIG. 1, video communication device 10 includes a video capture device including a video sensor 12, ROI video processing system 14, and a video memory 16. Video sensor 12 captures video frames, and may be provided within a camera. The low-complexity ROI video processing techniques may be useful in video telephony (VT) applications, such as video streaming and videoconferencing, between video communication device 10 and another video communication device. The techniques may be especially useful in low bit-rate wireless communication applications, such as mobile VT.

ROI video processing system 14 may include a number of components, such as a video sensor calibration module, a camera processing module, a ROI detection module, and a ROI video processing module, each of which may be tuned based on sensor-specific characteristics of video sensor 12 to enhance ROI video processing performance. Therefore, ROI video processing system 14 may accurately process video frames generated by different video capture devices based on physical characteristics and processing capabilities of various video sensors. In some cases, ROI video processing system 14 may be a ROI video coding system. In other cases, ROI video processing system 14 may comprise a ROI video enhancing system or another type of video processing system.

ROI video processing system 14 uses characteristics of video sensor 12 to automatically detect a ROI within a video frame received from video sensor 12, and preferentially processing the detected ROI relative to non-ROI areas within the video frame. The detected ROI may be of interest to a user of video communication device 10. For example, the ROI of the video frame may comprise a human face. A ROI may be referred to as a "foreground" area within a video frame and non-ROI areas may be referred to as "background" areas within the video frame.

ROI video processing system 14 performs calibration of video sensor 12, which generates sensor specific statistics based on a correlation of skin-color reflectance spectra of video sensor 12 and a testing target, such as a Macbeth Color Checker chart, commercially available from GretagMacbeth LLC of New Windsor, N.Y. Video sensor 12 generally refers to an array of sensing elements used in a camera. In some cases, video sensor 12 may include an array of complementary metal oxide semiconductor (CMOS) image sensing elements.

ROI video processing system 14 also performs camera processing based on the sensor specific statistics and video frames of a video sequence received from sensor 12 associated with video capture device 11 to estimate an illuminant condition of the video frame. ROI video processing system 14 may then automatically detect a ROI within the video frame based on the sensor specific statistics and the camera processing information. In some cases, ROI video processing system 14 may automatically detect a ROI within a current video frame of the video sequence based on the sensor specific statistics, the camera processing information, and motion information, e.g., motion vectors, obtained from video processing by tracking the ROI between a current video frame and a previous video frame of the video sequence.

ROI video processing system 14 then preferentially processes the video frame including the detected ROI and stores the video frame in video memory 16. For example, ROI video processing system 14 may preferentially encode the detected ROI within the video frame relative to non-ROI areas within the video frame. After each frame of the video sequence is encoded, video communication device 10 may send an output image bitstream including the preferentially processed ROI to another video communication device.

As an example, VT applications permit users to share video and audio information to support applications such as videoconferencing. In a VT system, users may send and receive video information, only receive video information, or only send video information. Video communication device 10 may further include appropriate transmit, receive, modem, and processing electronics to support wired or wireless communication. For example, video communication device 10 may comprise a wireless mobile terminal or a wired terminal equipped for communication with other terminals.

Examples of wireless mobile terminals include mobile radio telephones, mobile personal digital assistants (PDAs), mobile computers, or other mobile devices equipped with wireless communication capabilities and video encoding and/or decoding capabilities. For example, video communication device 10 may comprise a so-called camera phone or video phone used in VT applications. Examples of wired terminals include desktop computers, video telephones, network appliances, set-top boxes, interactive televisions, or the like.

In the embodiment of video coding, ROI video processing system 14 may preferentially encode a ROI automatically detected from a video frame received from video sensor 12 based on characteristics of video sensor 12. For example, ROI video processing system 14 may allocate additional coding bits to the detected ROI of the video frame and allocate a reduced number of coding bits to non-ROI areas of the video frame.

In mobile applications, in particular, the amount of encoding bits available to encode a video frame can be low and vary according to wireless channel conditions. Accordingly, preferential allocation of coding bits to ROIs can be helpful in improving the visual quality of the ROI while efficiently conforming to applicable bit rate requirements. Hence, with preferential encoding of the detected ROI, a recipient is able to view the ROI of the video frame more clearly than non-ROI areas of the video frames. Video communication device 10 may then transmit the encoded video frame over a wired or wireless communication channel to another communication device.

As described above, ROI video processing system 14 may implement techniques for performing ROI video processing based on low-complexity automatic ROI detection within video frames of video sequences. The low-complexity automatic ROI detection may be based on characteristics of video sensor 12 within video communication device 10. The disclosed techniques include a video processing technique capable of tuning and enhancing components within ROI video processing system 14 included in video communication device 10. For example, the video processing techniques may tune and enhance a video sensor calibration module, a camera processing module, a ROI detection module, and a ROI video processing module based on characteristics of video sensor 12.

The video processing technique may be universally applicable to different types of video sensors. Therefore, the video processing technique may be used to process video frames generated by different video capture devices based on physical characteristics and processing capabilities of various video sensors. In addition, the video processing technique enables flexible communication and cooperation among the components included in ROI video processing system 14. In this way, the disclosed techniques may enhance the performance of ROI video processing system 14 based on physical characteristics and statistics of video sensor 12.

The disclosed techniques also include an automatic ROI detection technique that uses the physical characteristics of video sensor 12 and camera processing side-information from video sensor 12. For example, the camera processing side-information may include white balance processing information, color correction processing information that improves color accuracy, nonlinear gamma processing information that compensates display nonlinearity, and color conversion processing information. The color conversation processing information may be generated when converting from RGB color space to YCbCr color space, where Y is the luma channel, and CbCr are the chroma channels. The automatic ROI detection technique improves ROI detection accuracy, which directly enhances the performance of ROI video processing system 14. For example, the skin region detector may use video sensor statistics to accurately detect a skin map within a video frame, and the face detector uses the skin map to detect one or more faces within the video frame.

The disclosed techniques also include a motion-based ROI detection technique that uses motion information obtained during motion estimation in video processing. For example, a face detector uses a skin map and the motion information, e.g., motion vectors, to perform low-complexity face detection that efficiently extracts one or more faces, i.e., ROIs, within the skin map based on the motion information.

The automatic ROI detection techniques may then generate ROIs for each of the faces detected within the video frame. The disclosed techniques then apply the generated ROIs within the video frame to the video processing module included in ROI video processing system 14. For example, in the case of video coding, the ROI processing module may use weighted bit allocation and adaptive background skipping to provide superior coding efficiency. After each frame of the video sequence is processed, video communication device 10 may send an output image bitstream of the preferentially coded video frame including the ROI to another video communication device.

ROI video processing system 14 may be implemented in hardware, software, firmware or any combination thereof. For example, various aspects of ROI video processing system 14 may be implemented within one or more digital signal processors (DSPs), microprocessors, application specific integrated circuits (ASICs), field programmable logic arrays (FPGAs), or any other equivalent integrated or discrete logic circuitry, as well as any combinations of such components. The term "processor" may generally refer to any of the foregoing logic circuitry, alone or in combination with other logic circuitry. When implemented in software, the functionality ascribed to ROI video processing system 14 may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions are executed to support one or more aspects of the functionality described in this disclosure.

FIGS. 2A and 2B are diagrams illustrating a definition of a ROI 24 and a non-ROI area 26 within a video frame 20 of a video sequence. In the example of FIG. 2B, the ROI is depicted as a human face ROI 24. In other embodiments, the ROI may comprise a rectangular ROI or another non-rectangular ROI that may have a rounded or irregular shape. ROI 24 contains the face 22 of a person presented in video frame 20. The non-ROI area 26, i.e., the background, is highlighted by shading in FIG. 2B.

ROI 24 may be automatically detected from video frame 20 by a ROI detection module included in ROI video processing system 14 from FIG. 1. For VT applications, a video communication device, such as video communication device 10 from FIG. 1, may incorporate ROI video processing system 14 to automatically detect ROI 24 within video frame 20 and preferentially encode ROI 24 relative to non-ROI areas within video frame 20. In that case, ROI 24 may encompass a portion of video frame 20 that contains the face 22 of a participant in a videoconference. Other examples include preferential encoding of the face of a person presenting information in streaming video, e.g., an informational video or a news or entertainment broadcast. The size, shape and position of ROI 24 may be fixed or adjustable, and may be defined, described or adjusted in a variety of ways.

ROI 24 permits a video sender to emphasize individual objects within a transmitted video frame 20, such as the face 22 of a person. Conversely, ROI 24 permits a video recipient to more clearly view desired objects within a received video frame 20. In either case, face 22 within ROI object 24 is encoded with higher image quality relative to non-ROI areas 26 such as background regions of video frame 20. In this way, the user is able to more clearly view facial expressions, lip movement, eye movement, and the like. In some embodiments, ROI 24 also may be encoded not only with additional coding bits, but also enhanced error detection and resiliency.

Figure 3:
FIG. 3 illustrates changes in object movement/rotation and shape deformation for an object presented within a ROI of a video sequence.
Figure 4:
FIG. 4 illustrates changes in facial expression for a person within a ROI of a video sequence.

FIG. 3 illustrates changes in object movement/rotation and shape deformation for an object presented within a ROI of a video sequence. In particular, the head of the person pictured in Frames 0 and 1 of FIG. 3 changes its position significantly. In the example of FIG. 3, the person's head tilts in Frame 1 relative to Frame 0. FIG. 4 illustrates changes in facial expression for a person within a ROI of a video sequence. In particular, the mouth of the person pictured in Frames 0 and 1 transitions from a substantially closed position to a wide open position. Hence, FIGS. 3 and 4 represent cases of large amounts of movement in the ROI of a video sequence.

Figure 5:
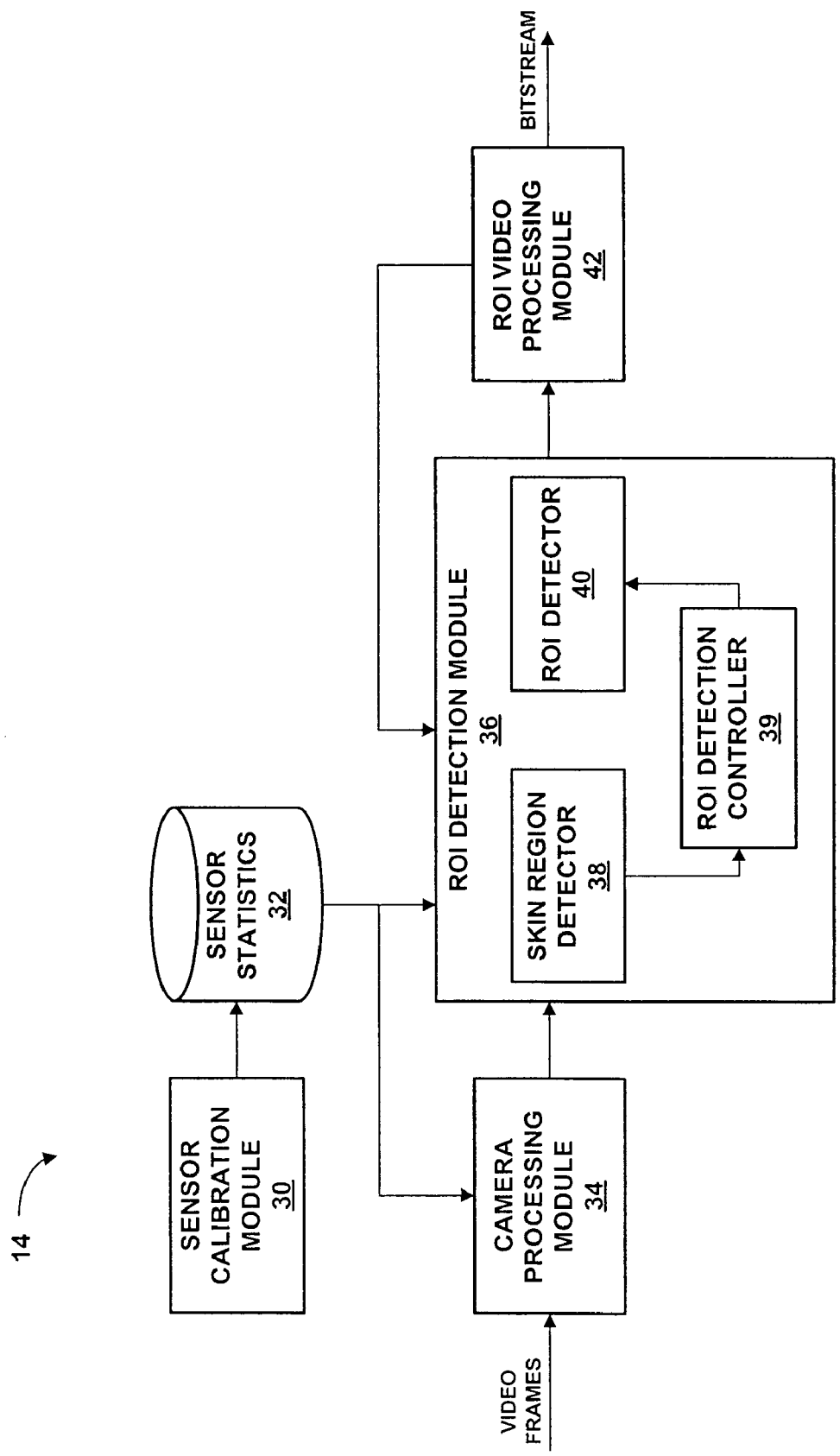
FIG. 5 is a block diagram illustrating the ROI video processing system within the video communication device that preferentially codes ROIs of video frames based on characteristics of a video sensor.

FIG. 5 is a block diagram illustrating ROI video processing system 14 within video communication device 10 that preferentially processes ROIs within video frames based on low-complexity automatic ROI detection. The low-complexity automatic ROI detection may be based on characteristics of video sensor 12. ROI video processing system 14 may receive the video frames from video capture device 11 through video sensor 12. ROI video processing system 14 may process intra-mode video frames of the video sequence independently from other frames of the video sequence and without motion information. ROI video processing system 14 may process inter-mode frames based on motion information for a ROI between the current video frame and a previous video frame of the video sequence stored in video memory 16.

In the illustrated embodiment, ROI video processing system 14 includes a sensor calibration module 30, sensor statistics 32, a camera processing module 34, an automatic ROI detection module 36, and a ROI video processing module 42. Sensor statistics 32 are obtained from sensor calibration module 30 during the sensor calibration process. Camera processing module 34 and ROI detection module 36 use sensor statistics 32 to accurately detect ROIs within an intra-mode video frame received from video capture device 11 through video sensor 12. ROI detection module 36 also relies on information, such as an illuminant condition, detected during camera processing by camera processing module 34. In addition, ROI detection module 36 may receive motion information, e.g., motion vectors, generated by ROI video processing module 42 between a current video frame and a previous video frame to enable ROI detection within inter-mode frames.

Figure 6A:
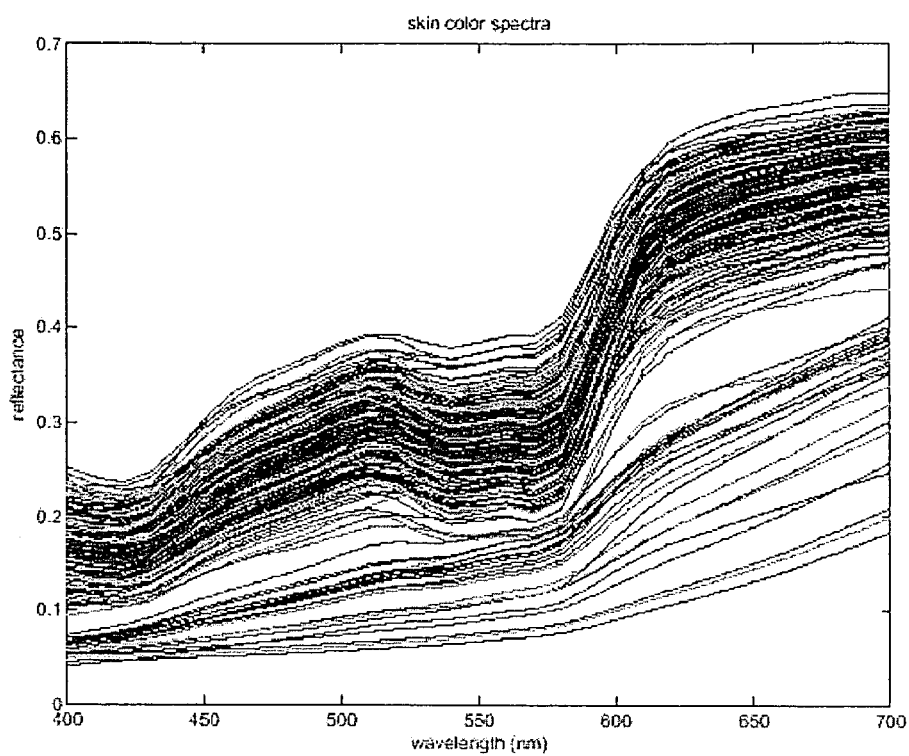
FIG. 6A illustrates an exemplary skin color reflectance spectra of a video sensor.
Figure 6B:
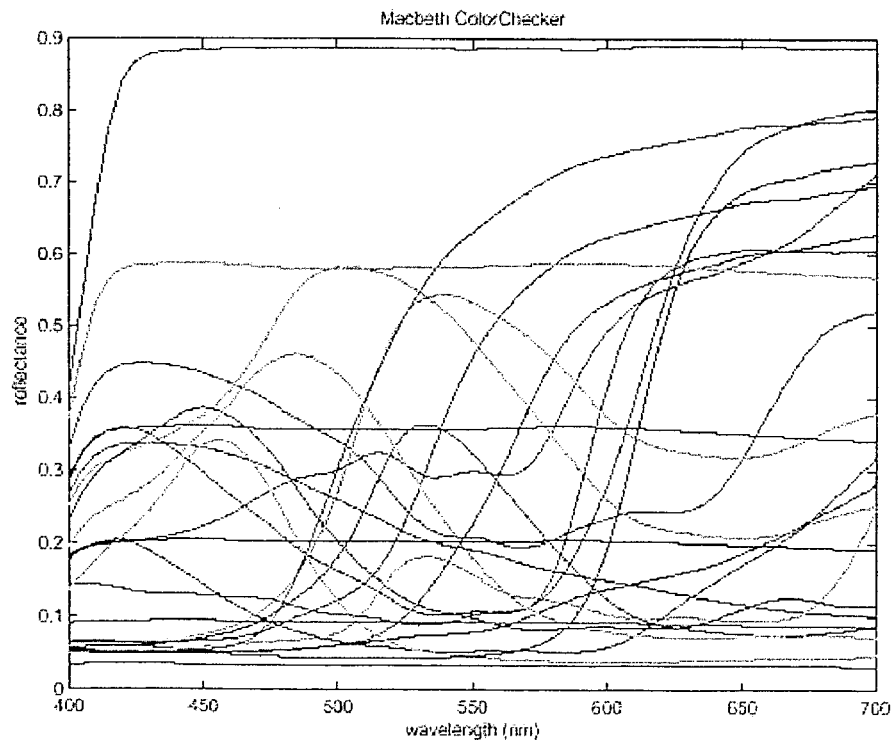
FIG. 6B illustrates an exemplary reflectance spectra of a Macbeth ColorChecker testing target.

In ROI video processing system 14, sensor calibration module 30 calculates inherent skin color statistics of specific video sensor 12. Sensor calibration module 30 may generate sensor statistics 32 for a variety of video sensors such that ROI video processing system 14 may enhance ROI video processing performance based on any video sensor included within video communication device 10. Sensor calibration module 30 obtains sensor statistics 32 based on the correlation of the skin color reflectance spectra of video sensor 32 and the spectra of a testing target, for example a Macbeth ColorChecker chart. FIG. 6A illustrates an exemplary skin color reflectance spectra of video sensor 32. FIG. 6B illustrates an exemplary reflectance spectra of the Macbeth ColorChecker testing target.

It may be assumed that a skin color reflectance spectrum can be approximated by a linear combination of the reflectance spectra of a limited number of Macbeth ColorChecker color patches, such as:

$$R_{skin}(\lambda) = \sum_{i=1}^{K} b_i * R_i^{Macbeth}(\lambda), \quad \forall \lambda \in [400 \text{ nm}, 700 \text{ nm}], \quad (1)$$

where K is the number of reflectance spectra of the Macbeth ColorChecker, $\lambda$ is the wavelength, $R_{skin}(\lambda)$ and $R_i^{Macbeth}(\lambda)$ are the corresponding reflectance of skin color and the ith Macbeth ColorChecker color patch, and $\{b_i\}$ (i=1, 2, . . . , K) is the set of weighting factors to be calculated. In this case, the corresponding RGB (red, green, blue) signals of the skin color can be represented by the same linear combination of the RGB signals of the corresponding Macbeth color patches by:

$$RGB_{skin} = \sum_{i=1}^{K} b_i * RGB_i^{Macbeth}, \quad (2)$$

where $RGB_{skin}$ and $RGB_i^{Macbeth}$ are the corresponding RGB signal intensity values of skin color and the ith Macbeth ColorChecker color patch.

The above assumptions are allowable because, for a given sensor and a certain reflectance spectra, the corresponding camera raw RGB signal can be theoretically calculated by:

$$RGB = \int_{400\,nm}^{700\,nm} SS(\lambda) * L(\lambda) * R(\lambda) d\lambda, \quad (3)$$

where $SS(\lambda)$, $L(\lambda)$, $R(\lambda)$ are the sensor spectral sensitivity function, illuminant spectral power distribution, and object reflectance spectrum. Therefore, equation (2) can be derived from equation (1) and equation (3). For a specific sensor, such as video sensor 12, after obtaining all the potential weighting factors $\{b_i\}$ and after measuring the $RGB_i^{Macbeth}$ value, sensor calibration module 30 may calculate all the combinations of $RGB_{skin}$ by using equation (2).

In this way, sensor calibration module 30 may obtain a skin-color map in the RGB color space for video sensor 12 for future use by skin region detector 38 within ROI detection module 36. Sensor calibration module 30 may obtain the potential weighting factors $\{b_i\}$ solving equation (1) using a skin color reflectance spectra database. Through the database, the values of $R_{skin}(\lambda)$ and $R_i^{Macbeth}(\lambda)$ used in equation (1) are available, and hence sensor calibration module 30 may obtain the corresponding $\{b_i\}$ vectors for all kinds of skin colors.

Figure 6C:
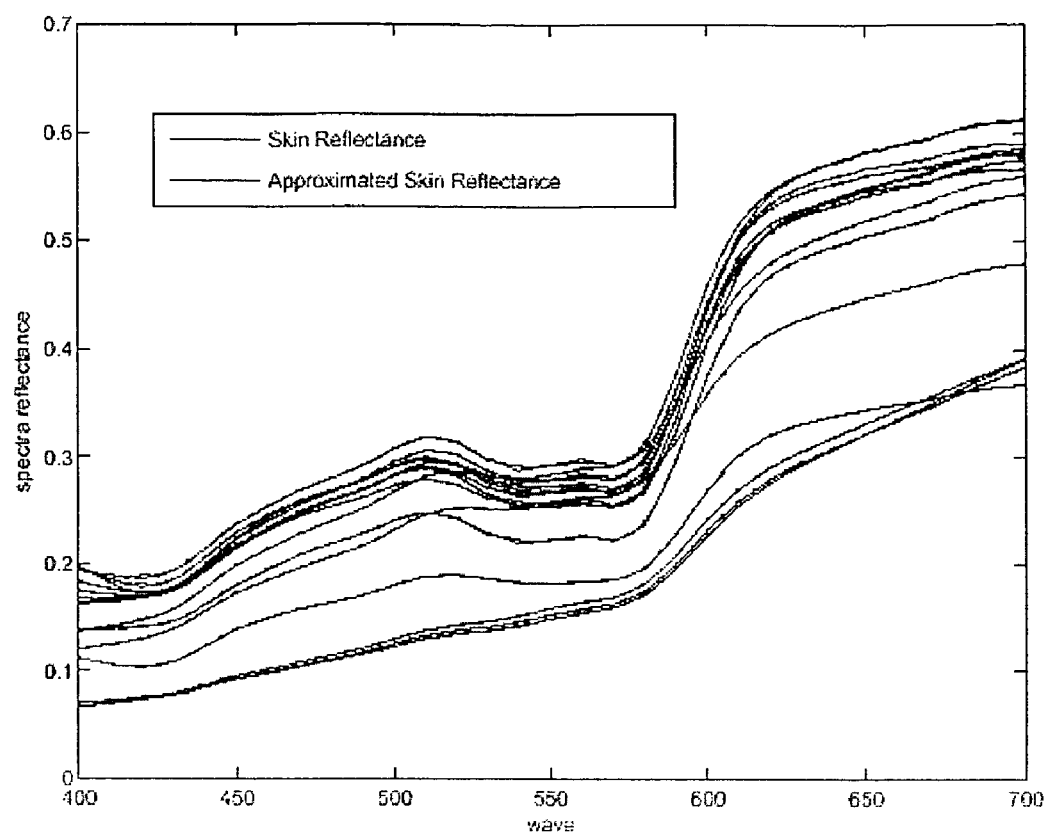
FIG. 6C illustrates an exemplary reflectance spectra that verifies consistency of an original and a reconstructed skin color reflectance spectra.

Experimental results have indicated that the above assumption is reasonable, which means that the skin color reflectance spectra can be decomposed into a linear combination of twenty-four Macbeth ColorChecker color patches. In addition, the derived weighting factors $\{b_i\}$ make the constructed skin color reflectance spectra consistent by composition with the original skin color spectra. FIG. 6C illustrates an exemplary reflectance spectra that verifies the consistence of the original and reconstructed skin color reflectance spectra and validates the assumption.

The sensor calibration approach described above significantly reduces the complexity of the original problem. In general, sensor calibration can be time consuming and may require expensive equipment to measure the sensor spectral sensitivity of a specific sensor. Therefore, it may not be feasible to derive the RGB value of a skin color directly from equation (3), although both illuminant and reflectance data are achievable. The spectra correlation observed by sensor calibration module 30 may reduce resource consumption within ROI video processing system 14 while detecting the sensor spectral sensitivity.

In some cases, the illuminant condition may affect the range of the weighting factors $\{b_i\}$ and therefore the resulting skin-color map. To remove non-uniform illumination and a sensor nonlinear response, sensor calibration module 30 normalizes the interpolated raw RGB signals for each patch of the Macbeth ColorChecker under each illuminant by flat fielding through a uniform gray plane capture and subtraction of constant black level (BlackLevel), such as:

$$RGB = \frac{RGB - BlackLevel}{GrayPlane - BlackLevel}, \quad (4)$$

where GrayPlane is the raw signal on the gray plane which corresponds to the Macbeth ColorChecker. In addition, sensor calibration module 30 classifies the illuminant into three classes (e.g., daylight—CIE D65, tungsten light—CIE A, and fluorescent light—TL84) and calculates the corresponding sensor statistics for each of them.

Because most video processing systems use the YCbCr (luminance, chrominance blue, chrominance red) color space instead of RGB, sensor calibration module 30 transforms the RGB color map into the YCbCr space through white balance, color correction, and gamma correction processing. The transformed color map comprises an ellipsoid, which is clustered in the CbCr plane but is scattered in the Y axis. In order to avoid storing a large volume of data for the 3D color space, sensor calibration module 30 divides Y into multiple ranges. For each Y, sensor calibration module 30 then models the likelihood that an input chrominance X belongs to a skin-color map by a Gaussian model:

$$P(X) = \frac{1}{2\pi|\Lambda|^{1/2}} \exp\left[-\frac{1}{2}x^2\right], \quad (5)$$

where x is the Mahalanobis distance defined as:

$$x^2 = (X-\mu)^T \Lambda^{-1} (X-\mu), \quad (6)$$

and the mean vector $\mu$ and the covariance matrix $\Lambda$ of the density can be calculated from the coordinates of the points in the CbCr color map.

In other words, given a threshold $x_T^2$, X can be classified as skin chrominance if $x^2 \leq x_T^2$ and as non-skin chrominance otherwise. The inequality $x^2 \leq x_T^2$ defines an elliptical area with a center given by $\mu$ and principal axes given by the eigenvectors of $\Lambda$. The square-root of the threshold $x_T$ is chosen such that it is large when the luminance level is at the median and gradually becomes smaller at the far edges. Therefore, sensor calibration module 30 saves the pairs of $\mu$ and $\Lambda$ for each luminance range as sensor statistics 32 for video sensor 12.

Camera processing module 34 receives a video frame of a video sequence from video capture device 11 via video sensor 12. Camera processing module 34 also receives sensor statistics 32 generated by sensor calibration module 30 as described above. Camera processing module 34 handles camera raw RGB data generation, white balance, color correction, camera gamma correction, and RGB color space to YCbCr space conversion. The output of camera processing module 34 is in the YCbCr 4:2:0 raw data format.

As described above, in order to consider the influence of the illuminant on a skin-color map, sensor calibration module 30 uses the Macbeth ColorChecker under three illuminants (e.g., daylight—CIE D65, tungsten light—CIE A, and fluorescent light—TL84) and obtains one skin color region for each illuminant at a luminance level range of [0.6, 0.7] in a normalized scale. Camera processing module 34 then estimates the illuminant of the received video frame and categorizes the estimated illuminant into one of the three illuminant types. In this way, camera processing module 34 selects an illuminant for the video frame. Skin region detector 38 within ROI detection module 36 may then use the sensor statistics that correspond to the selected illuminant when detecting skin-color regions within the video frame.

ROI detection module 36 includes skin region detector 38, a ROI detection controller 39, and ROI detector 40. In some cases, ROI detector 40 may be considered a face detector, e.g., in the case of VT applications or video broadcasting applications in which a person presents informational video such as a live or prerecorded news or entertainment broadcast. ROI detection module 36 implements an automatic ROI detection technique that uses the physical characteristics of video sensor 12 and camera processing side-information from video capture device 11. The automatic ROI detection technique improves ROI detection accuracy, which directly enhances the performance of ROI video processing system 14. For example, skin region detector 38 may use sensor statistics 32 to accurately detect a skin map within the video frame, and ROI detector 40 may use the skin map to detect one or more faces within the video frame.

Skin region detector 38 may perform a relatively simple detection process after receiving sensor statistics 32 generated by sensor calibration module 30. In this case, skin region detector 32 checks whether the chrominance (CbCr) values are inside the ellipse characterized by the sensor-dependent statistics 32. As described above, the parameters of the ellipse for the video frame are obtained from sensor calibration module 30. In addition, the parameters of the ellipse are illumination and luminance oriented and sensor-dependent. Therefore, the skin region detection processes described herein may be more accurate than a conventional skin-tone training approach trained by a large volume of images without any knowledge. Skin region detector 38 then generates a skin map from the detected skin-tone regions of the video frame.

ROI detection controller 39 then receives the skin map from skin region detector 38 and information regarding the video frame. In some cases, ROI detection controller 39 may also receive motion information for the video frame and a previous video frame of the video sequence from ROI video processing module 42. ROI detection controller 39 may then determine a quality of the skin map. If the skin map has a quality that is below a predetermined level, ROI detection controller 39 may send the skin map to ROI detector 40. If the skin map has a quality that is above a predetermined level, ROI detection controller 39 may decide to turn off ROI detector 40. In this case, the skin map generated by skin region detector 38 appears sufficiently capable of generating ROIs within the video frame. ROI detection module 36 may then generate the ROI within the video frame directly from the skin map.

In other cases, ROI detection controller 39 may determine a computational complexity of the video frame based on the received current video frame information and motion information. If the video frame has a computational complexity that is below a predetermined level, ROI detection controller 39 may decide to turn off ROI detector 40. ROI detection module 36 may then generate the ROI within the video frame directly from the skin map. If the video frame has a computational complexity that is above a predetermined level, ROI detection controller 39 may send the skin map to ROI detector 40. In this case, the video frame may include a new ROI or a large number of ROI features not previously processed, or the video frame may include a large amount of movement from the previous video frame of the video sequence.

Figure 8:
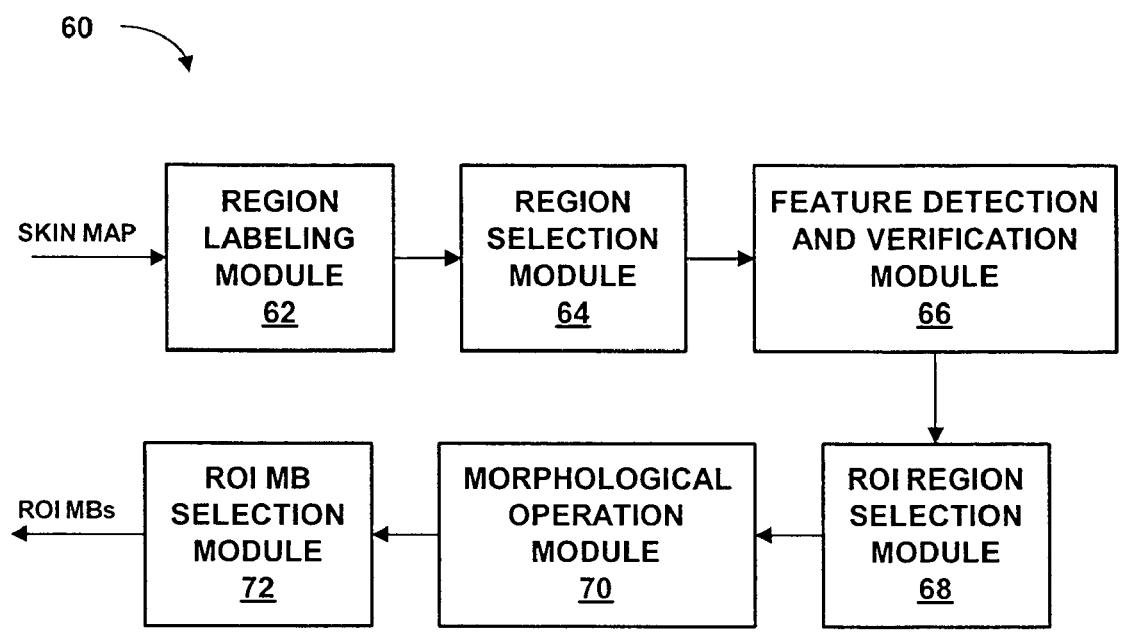
FIG. 8 is a block diagram illustrating a ROI detector from a ROI video processing system.

In accordance with an embodiment, ROI detector 40 implements a low-complexity ROI detection algorithm for real-time processing, described in more detail with respect to FIG. 8. As described above, ROI video processing system 14 enables ROI detector 40 to be turned off in certain situations in order to save power. ROI video processing system 14 takes advantage of the highly accurate sensor-optimized skin region detector 38 that does not incorrectly select potential ROI features, such as eye feature candidates and mouth feature candidates, within the skin map. ROI detector 40 may then automatically detect one or more faces or ROIs within the generated skin map of the video frame. In this way, ROI detector 40 may implement a low-complexity algorithm, which is especially useful in mobile VT applications. However, some other skin region detection algorithms may classify facial features as part of the skin map in order to speed up performance of skin region detector 38.

ROI detection module 36 may then generate a ROI for each of the faces detected within the video frame. ROI video processing module 42 then preferentially processes the generated ROIs relative to non-ROI areas within the video frame. In the embodiment of video coding, ROI video processing module 42 may preferentially encode the ROIs within the video frame by using weighted bit allocation and adaptive background skipping to provide superior coding efficiency. In particular, each ROI is allocated more bits than the background area, and the background area may be skipped entirely for some frames. In the case of background skipping, the background from a previous frame may be substituted for the background of the frame in which background encoding is skipped. After each frame of the video sequence is processed, ROI video processing module 42 may send an output image bitstream of the preferentially coded ROIs to another video communication device.

Figure 7:
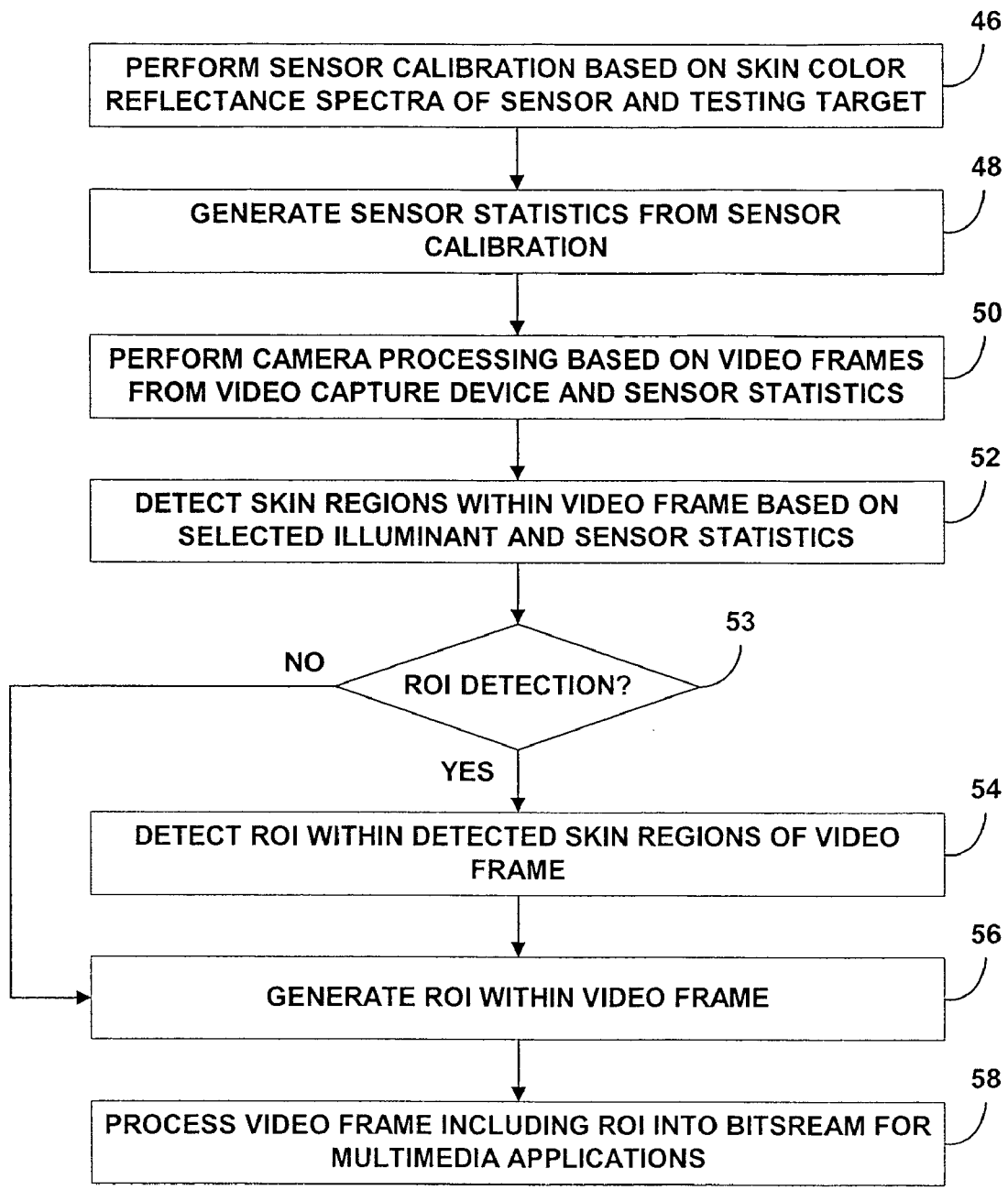
FIG. 7 is a flowchart illustrating operation of the ROI video processing system included in the video communication device based on characteristics of a video sensor.

FIG. 7 is a flowchart illustrating operation of ROI video processing system 14 included in video communication device 10 based on characteristics of video sensor 12. Sensor calibration module 30 performs sensor calibration based on a skin color reflectance spectra of video sensor 12 and a reflectance spectra of a testing target, such as a Macbeth ColorChecker chart (46). Sensor calibration module 30 then generates sensor statistics 32 for video sensor 12 based on the calibration process (48). As discussed previously, in some embodiments, the sensor statistics may include a mean vector $\mu$ and a covariance matrix $\Lambda$ calculated from the coordinates of the points in the CbCr color map prepared for video sensor 12. Pairs of $\mu$ and $\Lambda$ are stored by sensor calibration module 30 for each luminance range as sensor statistics 32 for video sensor 12.

Camera processing module 34 performs camera processing based on video frames received from video capture device 11 through video sensor 12 and sensor statistics 32 (50). Camera processing module 34 may estimate an illuminant condition of a received video frame and categorize the estimated illuminant into one of the three illuminant types (i.e., daylight—CIE D65, tungsten light—CIE A, and fluorescent light—TL84). The selected illuminant from camera processing module 34 and sensor statistics 32 corresponding to the selected illuminant are then fed into ROI detection module 36. ROI detection module 36 includes skin region detector 38, ROI detection controller 39, and ROI detector 40. Skin region detector 38 detects skin regions within the video frame based on the illuminant and sensor statistics 32 (52) to generate a skin map.

ROI detection controller 39 then determines whether to perform ROI detection within the video frame (53). For example, ROI detection controller 39 may decide to turn off ROI detector 40 and not perform ROI detection if the detected skin map is of sufficient quality to generate ROIs of the video frame. In addition, ROI detection controller may decide to turn off ROI detector 40 and not perform ROI detection if the video frame includes a small number of potential ROI features or a minimal amount of movement or variation between the video frame and a previous video frame of the video sequence. Turning off ROI detector 40 may reduce power consumption within ROI video processing system 14.

When ROI detection controller 39 receives a lower quality skin map or a higher complexity video frame, ROI detection controller 39 sends the skin map to ROI detector 40. ROI detector 40 detects one or more ROIs within the skin map from skin region detector 38 based on ROI feature detection and verification (54). Regardless of whether ROI detection is performed, ROI detection module 36 generates one or more ROIs based on either the detected skin map or the detected ROIs within the skin map (56). ROI generation module 36 then sends the generated ROIs of the video frame to ROI video processing module 42. ROI video processing module 42 preferentially processes the ROIs of the video frame into a bitstream for multimedia applications (58).

FIG. 8 is a block diagram illustrating a ROI detector 60 included in a ROI video processing system. ROI detector 60 may implement a low-complexity face detection algorithm that efficiently extracts one or more faces, i.e., ROIs, from a skin map of a video frame. In some cases, ROI detector 40 may be considered a face detector. For example, in the case of VT applications or video broadcasting applications in which a person presents informational video such as a live or prerecorded news or entertainment broadcast.

In one embodiment, ROI detector 60 may be substantially similar to ROI detector 40 included in ROI video processing system 14 from FIG. 5. In this case, ROI detector 60 may receive a skin map generated by skin region detector 38 based on sensor statistics 32 of video sensor 12 and perform low-complexity ROI detection based on sensor statistics 32. In another embodiment, ROI detector 60 may receive a skin map from a skin region detector not based on sensor statistics. In this case, ROI detector 60 may perform low-complexity ROI detection based on motion information received from a ROI video processing module similar to ROI video processing module 42 from FIG. 5.

In some cases, ROI detector 60 may process intra-mode video frames of a video sequence independently from other frames of the video sequence and without motion information. In other cases, ROI detector 60 may process inter-mode frames based on motion information for a ROI between the current video frame and a previous video frame of the video sequence. The motion information used by ROI detector 60 to process intra-mode frames may comprise motion vectors obtained during motion estimation in a ROI video processing module, such as ROI video processing module 42.

In the illustrated embodiment, ROI detector 60 includes a region labeling module 62, a region selection module 64, a feature detection and verification module 66, a ROI region selection module 68, a morphological operation module 70, and a ROI macroblock (MB) selection module 72. FIGS. 9A-9G are screen shots illustrating exemplary results of the techniques implemented by ROI detector 60 when automatically detecting ROIs within a skin map of a video frame generated based on sensor-specific statistics. In other cases, ROI detector 60 may automatically detect ROIs within a skin map of a video frame generated in another manner and without the use of sensor statistics.

Figure 9A:
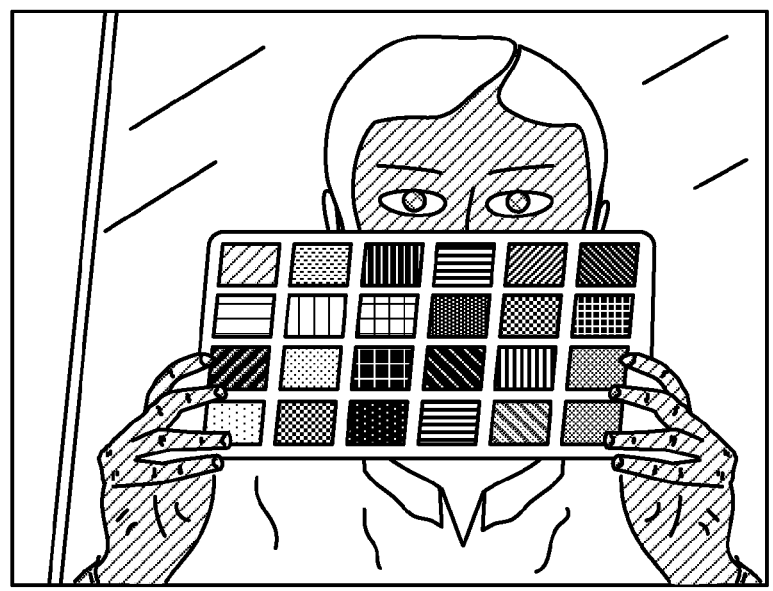
FIGS. 9A-9G are screen shots illustrating exemplary results of the techniques implemented by the ROI detector from FIG. 8 when automatically detecting ROIs within a skin map of a video frame generated based on sensor-specific statistics.
Figure 9B:
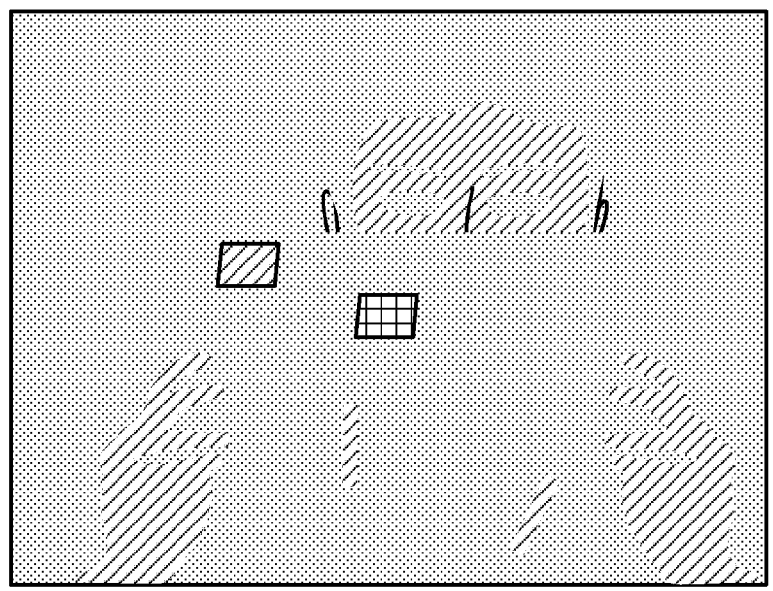

As described above in reference to FIG. 5, a skin region detector detects skin regions within a video frame and generates a skin map from the detected skin regions. FIG. 9A illustrates an exemplary video frame prior to any processing by a ROI detection module. FIG. 9B illustrates an exemplary skin map of the video frame generated by the skin region detector based on sensor statistics. Once the skin region detector generates the skin map of the video frame, region labeling module 62 divides the skin map into a number of disconnected regions. In this case, the skin region detector may assume that each face or ROI within the skin map is included in a connected region. In other words, the ROI features, e.g., facial features, within the skin map should prevent region labeling module 62 from dividing a face or ROI into more than one connected regions.

In addition, region selection module 64 may assume that there are at most two ROIs or faces in the video frame, which is reasonable for most cases and greatly simplifies the ROI detection process. Region selection module 64 selects up to three candidate regions from the disconnected regions of the skin map that include the largest areas within the video frame. ROI region selection module 68 then selects one or more ROI regions from the candidate regions based on facial features detected within each of the candidate regions by feature detection and verification module 66.

Feature detection and verification module 66 examines all of the candidate regions for facial features using a set of pre-determined rules. Normally the facial features are located in valley regions of the skin map characterized by high intensity contrast inside the candidate region. Therefore, feature detection and verification module 66 can find the valley regions by performing grayscale-close and dilation morphological operations. If a facial feature candidate has no overlapping areas with the detected valley regions, the facial feature candidate is removed from the candidate list. In this embodiment, feature detection and verification module 66 mainly performs eye detection, which may be based on two observations.

First, the chrominance components around the eyes normally contain high Cb and low Cr values. Therefore, feature detection and verification module 66 may construct a chrominance eye map by $$C = \frac{Cb^2 + (255 - Cr)^2 + (Cb/Cr)}{3}. \tag{7}$$

Once the chrominance eye map is obtained, feature detection and verification module 66 may apply a threshold to the chrominance (C) eye map to locate the brightest regions within the eye map for eye candidates. Feature detection and verification module 66 then applies morphological operations to merge substantially close brightest regions into single eye candidates.

Second, the eyes usually contain both dark and bright pixels in the luminance component. Therefore, feature detection and verification module 66 can use grayscale morphological operators to emphasize brighter and darker pixels in the luminance component around the eyes. Feature detection and verification module 66 may construct a luminance eye map by $$L = \frac{\text{Dilation}(Y)}{\text{Erosion}(Y) + 1}. \tag{8}$$

Once the luminance eye map is obtained, feature detection and verification module 66 may apply a threshold to the luminance (L) eye map to locate the brightest regions within the eye map for eye candidates. Feature detection and verification module 66 then applies morphological operations to merge substantially close brightest regions into single eye candidates.

Figure 9C:
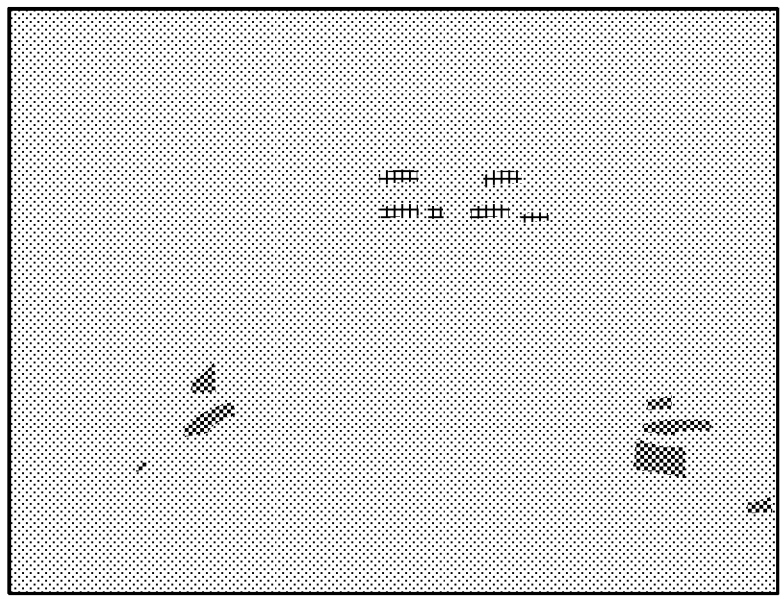

Feature detection and verification module 66 then joins the two eye maps to find the final eye feature candidates. FIG. 9C illustrates exemplary facial feature candidates, such as eye feature candidates, detected by feature detection and verification module 66. Clearly, other facial features, such as mouths, eyebrows, nostrils and chins, can also be detected as cues to find faces within the candidate regions. These addition facial features can be very useful when detecting a ROI or face within a video frame, especially when the eyes are invisible or blurred in the video frame.

Once, feature detection and verification module 66 detects facial feature candidates within one or more of the candidate regions, the facial features are verified based on a set of rules to eliminate any false detections. First, feature detection and verification module 66 overlaps the detected eye map with the non-skin region of the video frame that was not detected by the skin region detector. The skin region detector described above, i.e., skin region detector 38 from FIG. 5, does not falsely detect facial features when generating the skin map. Therefore, the correct eye features are not part of the skin map.

Figure 9D:
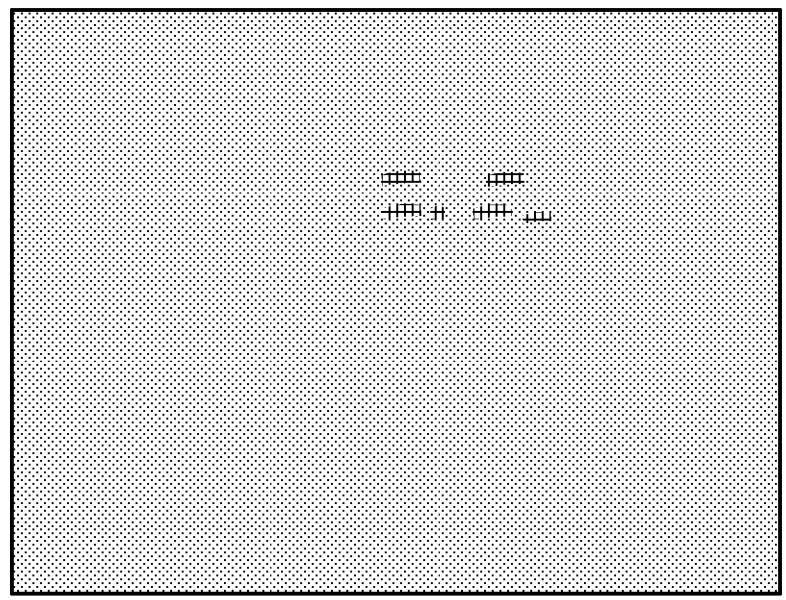

Second, facial features within the candidate regions of the skin map comprises an internal hole in the skin map, which means that a correct facial feature should be surrounded by skin regions. Third, the area of each of the candidate regions containing eye feature candidates should be within the range of [15, 500]. Fourth, the bounding box of each of the candidate regions containing eye feature candidate is included in one of the bounding boxes of the ROI region candidates. FIG. 9D illustrates exemplary facial features, such as eye features, verified by feature detection and verification module 66.

ROI region selection module 68 then selects the candidate region that includes the most facial features as the ROI region. In some cases, ROI region selection module 68 may select up to two ROI regions. ROI region selection module 68 selects the ROI region based on the observation that the ROI or facial region normally contains the most facial feature candidates and covers a larger area than other regions within the skin map. Therefore, ROI region selection module 68 may select ROI regions corresponding to the top two candidate regions with maximum values for a product of the number of facial features inside the region and the area of the region. If none of the candidate regions contains a facial feature, ROI region selection module 68 selects the largest candidate region as the ROI region.

Figure 9E:
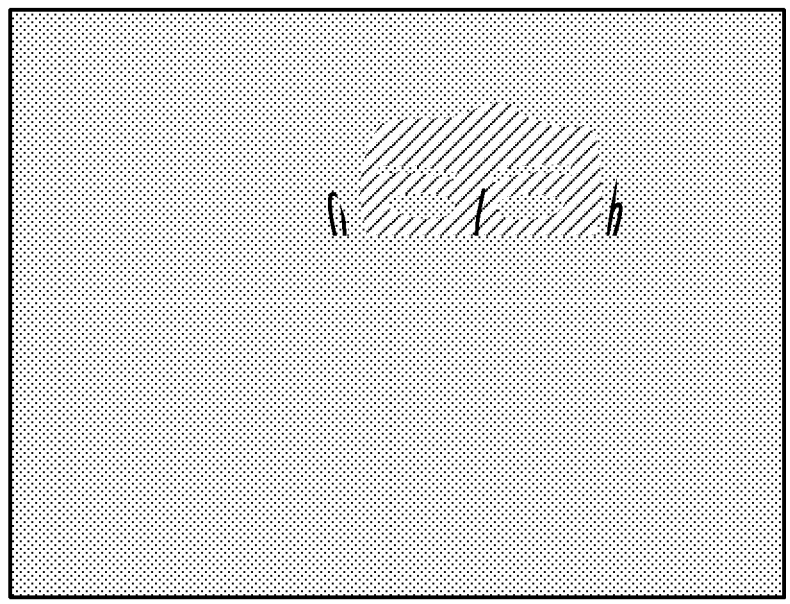
Figure 9F:
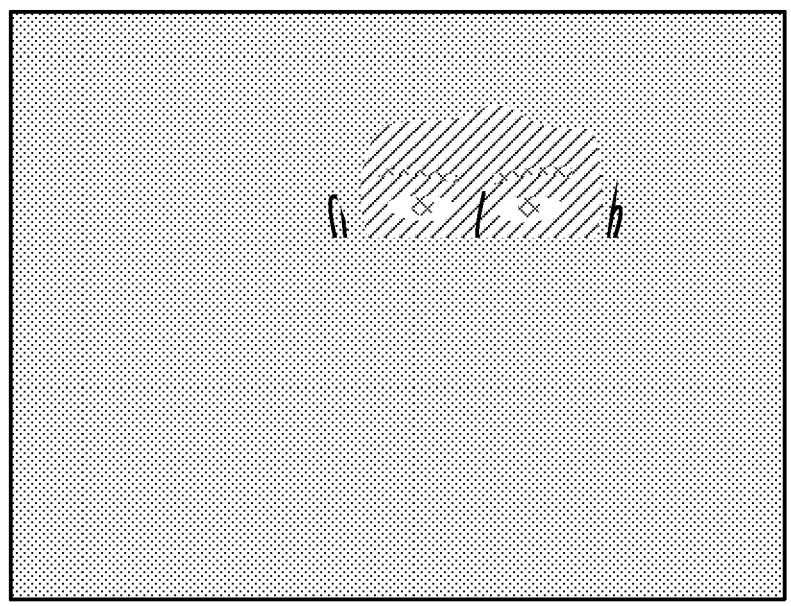

FIG. 9E illustrates an exemplary ROI region selected by ROI region selection module 68 based on the detected facial features. Morphological operation module 70 then performs morphological operations on the selected ROI region to fill holes within the ROI region corresponding to the detected facial features. FIG. 9F illustrates an exemplary ROI region after morphological operations performed by morphological operation module 70.

Figure 9G:
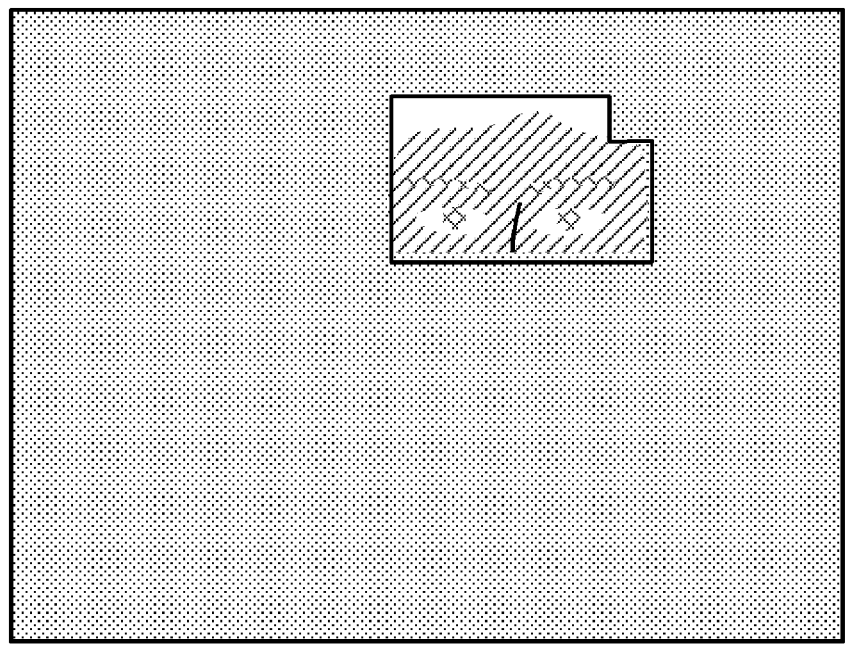

Finally, ROI MB selection module 72 selects macroblocks of the video frame that correspond to the ROI as ROI macroblocks. For example, ROI MB selection module 72 may select a macroblock as part of the ROI of the video frame if more than a predetermined percentage of the area of the macroblock overlaps with the selected ROI region. In some cases, the predetermined percentage may comprise 10%. A macroblock is a video block that forms part of a video frame. The size of the MB may be 16 by 16 pixels. However, other MB sizes are possible. Macroblocks will be described herein for purposes of illustration, with the understanding that macroblocks may have a variety of different sizes. FIG. 9G illustrates exemplary ROI macroblocks selected by ROI MB selection module 72 based on the selected ROI region of the video frame. ROI detection module 36 then generates the ROI of the video frame based on the ROI macroblocks selected by ROI MB selection module 72.

The ROI detection process described above comprises an intra-mode ROI detection process in which ROI detector 60 processes video frames of a video sequence independently from other frames of the video sequence and without motion information. In other cases, ROI detector 60 may perform a low-complexity inter-mode ROI detection process based on motion information for a ROI between the current video frame and a previous video frame of the video sequence. The motion information used by ROI detector 60 to process intra-mode frames may comprise motion vectors obtained during motion estimation in a ROI video processing module. The intra-mode ROI detection process may be considered a higher-complexity process. Due to the motion information, the inter-mode ROI detection process may be considered a lower-complexity process. In the case where the skin map received by ROI detector 60 is generated based on sensor-specific statistics, the improved quality of the skin map may further reduce the complexity of both the intra-mode and the inter-mode ROI detection processes.

In the inter-mode ROI detection process, ROI detector 60 detects a ROI within a current video frame based on the tracking of ROIs in a previous frame and takes advantage of the motion vectors received from a ROI video processing module, such as ROI video processing module 42 from FIG. 5. In this case, ROI detector 60 compares each macroblock of the current video frame with a corresponding macroblock of the previous video frame. The ROI detector 60 determines whether the corresponding macroblock of the previous video frame has a sufficient amount of overlap with a ROI within the previous video frame. ROI detector 60 also determines wherein the current macroblock has a sufficient amount of overlap with the skin map of the current frame. For example, a sufficient amount of overlap may comprise an overlap of more than a predetermined percentage of the area of the macroblock with the ROI of the previous video frame or the skin map of the current video frame. In some cases, the predetermined percentage may comprise 10%.

If both of the conditions are satisfied, ROI detector 60 selects the current macroblock as part of the ROI region. This solution may couple well with the video processing algorithms implemented by the ROI video processing module and contains relatively simple operations. Therefore, the low-complexity inter-mode ROI detection process described herein is much more efficient than other inter-mode approaches.

The low-complexity inter-mode ROI detection process may have difficulties tracking fast moving ROIs. Therefore, a ROI detection controller, substantially similar to ROI detection controller 39 from FIG. 5, connected to ROI detector 60 may implement an adaptive algorithm that calls the higher-complexity intra-mode ROI detection process in certain situations. For example, the ROI detection controller may cause ROI detector 60 to perform intra-mode ROI detection periodically when the number of consecutive video frames in which a ROI was automatically detected using the inter-mode ROI detection processes is above a predetermined level (e.g., every 10 frames). In another example, the ROI detection controller may cause ROI detector 60 to perform intra-mode ROI detection when the ROI detection controller detects an amount of motion activity between video frames of the video sequence that is above a pre-determined level. In this way, the adaptive algorithm decreases complexity within the ROI video processing system that includes ROI detector 60 dramatically, although the adaptive algorithm may be unable to rapidly detect new faces appearing in the video frames.

Figure 10A:
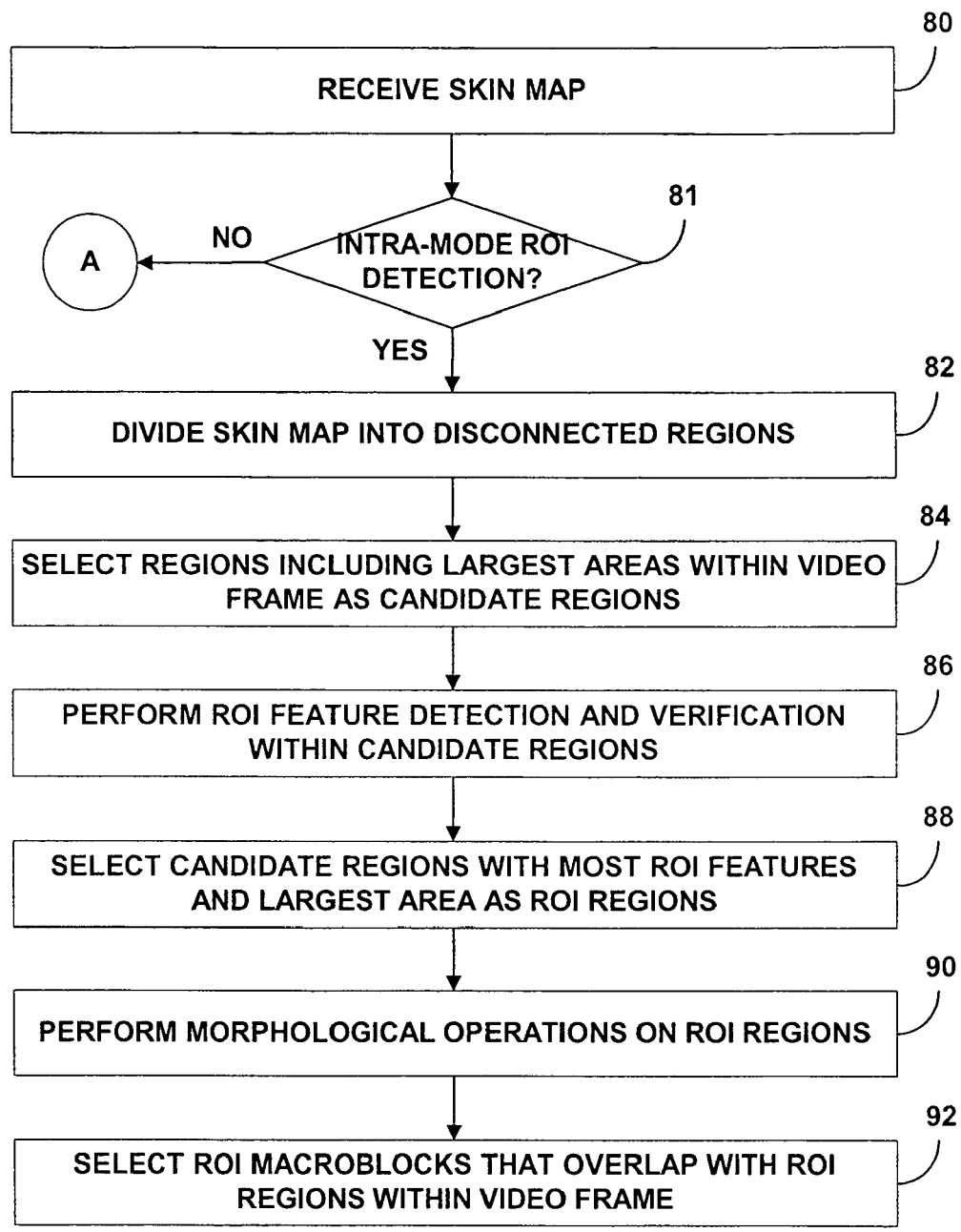
FIGS. 10A and 10B are flowcharts illustrating operation of the ROI detector within a ROI detection module of a ROI video processing system
Figure 10B:
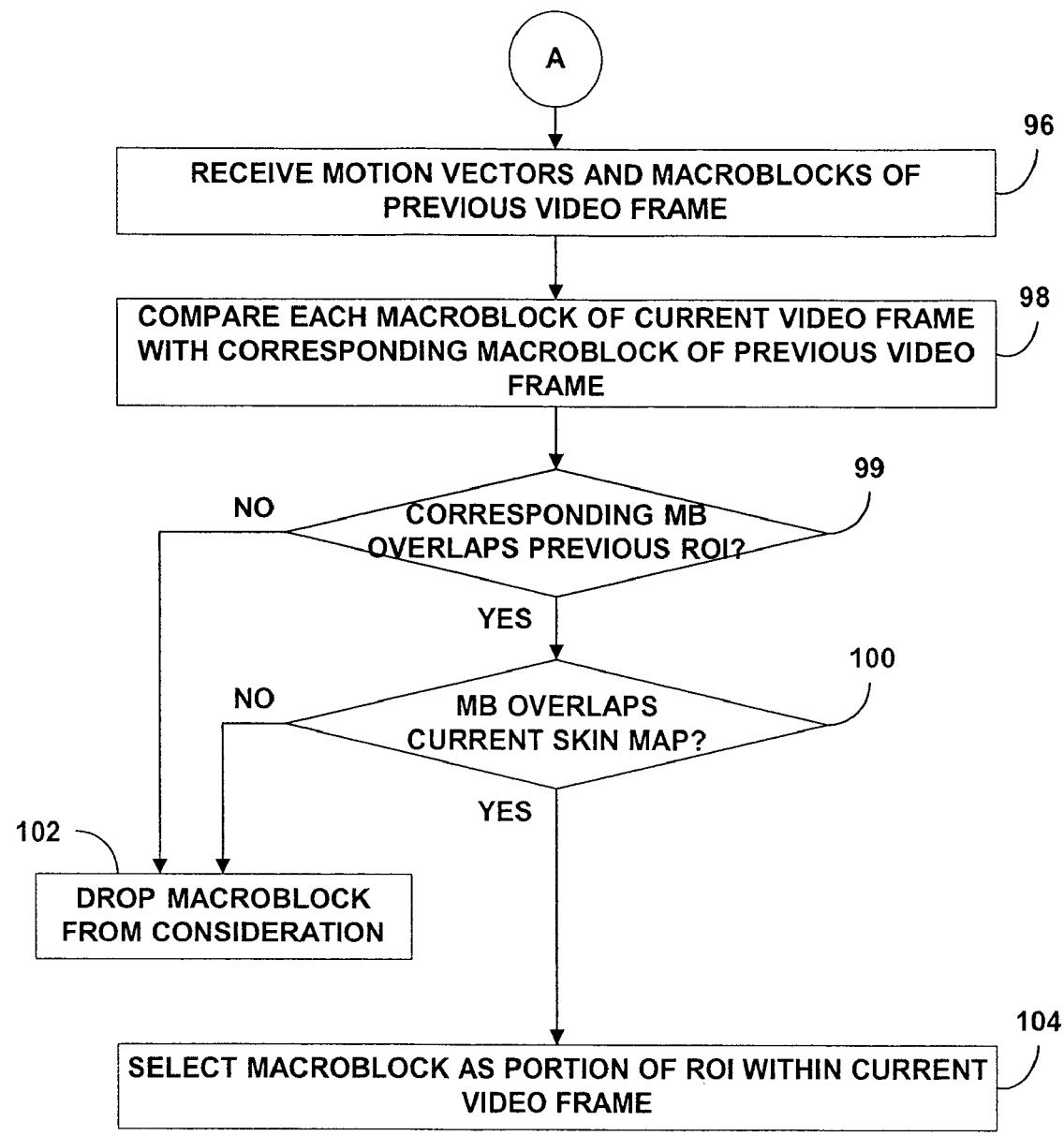

FIGS. 10A and 10B are flowcharts illustrating operation of ROI detector 60 within a ROI detection module of a ROI video processing system. ROI detector 40 receives a skin map (80). In one embodiment, ROI detector 60 may be substantially similar to ROI detector 40 included in ROI video processing system 14 from FIG. 5. In this case, ROI detector 60 may receive a skin map generated by skin region detector 38 based on sensor statistics 32 of video sensor 12 and perform low-complexity ROI detection based on sensor statistics 32. In another embodiment, ROI detector 60 may receive a skin map from a skin region detector not based on sensor statistics. In this case, ROI detector 60 may perform low-complexity ROI detection based on motion information received from a ROI video processing module similar to ROI video processing module 42 from FIG. 5.

A ROI detection controller included in the ROI detection module then determines whether ROI detector 60 performs an intra-mode ROI detection process or an inter-mode ROI detection process (81). ROI detector 60 may perform the intra-mode ROI detection process on video frames of a video sequence independently from other frames of the video sequence and without motion information. ROI detector 60 may perform the inter-mode ROI detection process based on motion information for a ROI between the current video frame and a previous video frame of the video sequence.

In some cases, the ROI detection controller may cause ROI detector 60 to perform the high-complexity intra-mode ROI detection process every N frames (e.g., 10 frames) or when large movements or changes are detected between a current video frame and a previous video frame. In other cases, the ROI detection controller may cause ROI detector 60 to perform the low-complexity inter-mode ROI detection process if the last video frame was processed using the intra-mode process or when a minimal amount of movement or change is detected between the current video frame and the previous video frame.

As shown in FIG. 10A, if the ROI detection controller causes ROI detector 60 to perform the intra-mode ROI detection process (yes branch of 81), region labeling module 62 divides the skin map received from skin region detector 38 into a plurality of disconnected regions (82). Region selection module 64 then selects the regions that include the largest areas within the video frame as candidate regions (84). In order to maintain low-complexity, region selection module 64 may only select three candidate regions.

Feature detection and verification module 66 performs feature detection within each of the candidate regions and then verifies the facial feature candidates to eliminate false detections (86). ROI region selection module 68 then detects the candidate region with the most ROI features and the largest area as a ROI region (88). For example, ROI region detection module 68 may select the two candidate regions with the maximum amount of ROI features. In the case where none of the candidate regions includes ROI features, ROI region selection module 68 may select the candidate region with the largest area of the video frame as the ROI region.

Morphological operation module 70 then performs morphological operations on the one or more selected ROI regions to fill holes within the ROI regions corresponding to the detected facial features (90). Finally, ROI MB selection module 72 selects macroblocks of the video frame that overlap with the selected ROI regions as ROI macroblocks (92). For example, ROI MB selection module 72 may select a macroblock as part of the ROI of the video frame if more than a predetermined percentage, e.g., 10%, of the area of the macroblock overlaps with the selected ROI regions. ROI detection module 36 then generates the ROI of the video frame based on the ROI macroblocks selected by ROI MB selection module 72.

As shown in FIG. 10B, if the ROI detection controller causes ROI detector 60 to perform the inter-mode ROI detection process (no branch of 81), ROI detection module 60 receives motion vectors and macroblocks of a previous video frame from a ROI video processing module (96). ROI detector 60 then compares each macroblock of the current video frame with a corresponding macroblock of the previous video frame (98).

ROI detector 60 determines whether the corresponding macroblock of the previous video frame sufficiently overlaps the ROI of the previous video frame (99) and whether the macroblock of the current video frame sufficiently overlaps the skin map generated from the current video frame (100). If either of the conditions is not met, ROI detector 60 drops the macroblock from consideration as a portion of the ROI (102). If both of the conditions are met, ROI detector 60 selects the macroblock as a portion of the ROI within the current video frame (104). The ROI detection module that includes ROI detector 60 then generates the ROI of the video frame based on the ROI macroblocks selected by ROI detector 60.

Returning to FIG. 5, ROI video processing system 14 includes ROI video processing module 42 that preferentially processes the generated ROIs. As an example, ROI video processing module 42 will be described below as a ROI video coding module that preferentially encodes the ROIs within a video frame by using weighted bit allocation and adaptive background skipping. After each frame of the video sequence is processed, ROI video processing module 42 may send an output image bitstream of the preferentially coded ROIs to another video communication device.

ROI video processing module 42 implements an optimized ρ-domain bit allocation scheme for ROI video coding. In this case, ρ represents the number or percentage of non-zero quantized AC coefficients in a macroblock in video coding. The major difference between a ρ-domain and a QP-domain rate control model is that the ρ-domain model is more accurate and thus effectively reduces rate fluctuations.

In addition, ROI video processing module 42 uses a perceptual quality measurement for ROI video coding. For example, the normalized per pixel distortion of the ROI and non-ROI of the video frame may be denoted by $D_R$ and $D_{NR}$, and the ROI perceptual importance factor may be denoted by α. It may be assumed that the relationship among the aspects mentioned above can be simplified into a linear function in video quality evaluation, then the overall distortion of a video frame can be represented as:

$$D_{Frame} = \alpha D_R(f, \tilde{f}) + (1-\alpha) D_{NR}(f, \tilde{f}), \quad (9)$$

where $f$ and $\tilde{f}$ are the original and reconstructed frames. From equation (9), it is clear that α should be assigned real values between 0 and 1, and the selection of α is decided by end-users of video communication device 10 based on their requirements and expectations. Again, this measurement is not a perfect metric, but it may help the bit allocation process to favor subjective perception.

The total bit budget for a given frame $f$ may be denoted by $R_{budget}$ and the bit rate for coding the frame may be denoted by R, then the problem can be represented by:

$$\text{Minimize } D_{Frame}, \text{ such that } R \leq R_{budget}. \quad (10)$$

In ROI video coding, N may denote the number of macroblocks in the frame and $\{\rho_i\}$, $\{\sigma_i\}$, $\{R_i\}$ and $\{D_i\}$ respectively denote the set of ρs, standard deviation, rates and distortion (i.e., sum of squared error) for the ith macroblocks. Therefore, a set of weights $\{w_i\}$ for each macroblock may be defined as:

$$w_i = \begin{cases} \dfrac{\alpha}{K} & \text{if it belongs to } ROI \\ \dfrac{1-\alpha}{(N-K)} & \text{if it belongs to Non-}ROI \end{cases}, \quad (11)$$

where K is the number of macroblocks within the ROI. Therefore, the weighted distortion of the frame is:

$$D = \sum_{i=1}^{N} w_i D_i \quad (12)$$

$$= [\alpha D_{RF}(f, \tilde{f}) + (1-\alpha) D_{NF}(f, \tilde{f})] * 255^2 * 384,$$

Hence equation (4) can be rewritten as:

$$\text{Minimize } D, \text{ such that } R \leq R_{budget}. \quad (13)$$

ROI video processing module 42 may solve equation (13) by using a modeling-based bit allocation approach. The distribution of the AC coefficients of a nature image can be best approximated by a Laplacian distribution $$p(x) = \frac{\eta}{2} e^{-\eta|x|}.$$

Therefore, the rate and distortion of the ith macroblock can be modeled in equation (14) and equation (15) as functions of $\rho$, $$R_i = A\rho_i + B, \tag{14}$$

where A and B are constant modeling parameters, and A can be thought as the average number of bits needed to encode non-zero coefficients and B can be thought as the bits due to non-texture information.

$$D_i = 384\sigma_i^2 e^{-\theta \rho_i/384}, \tag{15}$$

where $\theta$ is an unknown constant.

ROI video processing module 42 optimizes $\rho_i$ instead of quantizers because ROI video processing module 42 assumes there is an accurate enough $\rho$-QP table available to generate a decent quantizer from any selected $\rho_i$. In general, equation (13) can be solved by using Lagrangian relaxation in which the constrained problem is converted into an unconstrained problem that:

$$\underset{\rho_i}{\text{Minimize}} J_\lambda = \lambda R + D \tag{16}$$

$$= \sum_{i=1}^{N} (\lambda R_i + w_i D_i)$$

$$= \sum_{i=1}^{N} [\lambda(A\rho_i + B) + 384 w_i \sigma_i^2 e^{-\theta \rho_i/384}],$$

where $\lambda^*$ is a solution that enables $$\sum_{i=1}^{N} R_i = R_{budget}.$$

By setting partial derivatives to zero in equation (16), the following expression for the optimized $\rho_i$ is obtained by:

$$\text{letting } \frac{\partial J_\lambda}{\partial \rho_i} = \frac{\partial \sum_{i=1}^{N}[\lambda(A\rho_i + B) + 384 w_i \sigma_i^2 e^{-\theta \rho_i/384}]}{\partial \rho_i} = 0, \tag{17}$$

which is $\lambda A - \theta w_i \sigma_i^2 e^{-\theta \rho_i/384} = 0,$ (18)

so $e^{-\theta \rho_i/384} = \frac{\lambda A}{\theta w_i \sigma_i^2},$ (19)

and $$\rho_i = \frac{384}{\theta}[\ln(\theta w_i \sigma_i^2) - \ln(\lambda A)]. \tag{20}$$

On the other hand, since $$R_{budget} = \sum_{i=1}^{N} R_i = \frac{384 A}{\theta}[\ln(\theta w_i \sigma_i^2) - \ln(\lambda A)] + NB, \tag{21}$$

so $\ln(\lambda A) = \frac{1}{N}\sum_{i=1}^{N} \ln(\theta w_i \sigma_i^2) - \frac{\theta}{384 NA}(R_{budget} - NB).$ (22)

From equation (20) and equation (22), bit allocation model I is obtained:

$$\rho_i = \frac{384}{\theta}\left[\begin{array}{c}\ln(\theta w_i \sigma_i^2) - \frac{1}{N}\sum_{i=1}^{N}\ln(\theta w_i \sigma_i^2) + \\ \frac{\theta}{384 NA}(R_{budget} - NB)\end{array}\right] \tag{23}$$

$$= \frac{R_{budget} - NB}{NA} + \frac{384}{\theta}\left[\ln(\theta w_i \sigma_i^2) - \frac{\sum_{i=1}^{N}\ln(\theta w_i \sigma_i^2)}{N}\right].$$

Similarly, if ROI video processing module 42 assumes a uniform quantizer with step size q, then bit allocation model II is generated:

$$\rho_i = \frac{\sqrt{w_i \sigma_i}}{\sum_{j=1}^{N}\sqrt{w_i \sigma_j}} \rho_{budget}. \tag{24}$$

The result indicates that both models perform as closely as the optimal solution. Given a bit budget for a frame and using equation (23) or equation (24), ROI video processing module 42 can optimally allocate the bits over the macroblocks within the frame to minimize the perceptual distortion defined in equation (9). ROI video processing module 42 may use the bit allocation model II in ROI video processing system 14 due to its simplicity.

In a very low bit-rate case, the non-ROI areas of the video frame are normally coarsely coded which results in low visual quality. On the other hand, in most cases of VT applications where backgrounds are considered non-ROI areas, there is a limited amount of movement in the background. Therefore, background skipping is a potential solution for reallocating bits to improve the quality of foreground and coded background regions as long as the skipping does not severely hurt the video fidelity. In this case, ROI video processing module 42 groups every pair of frames into a unit. In each unit, the first background is coded while the second background is skipped based on predicted macroblocks with zero motion vectors. In frame-level bit allocation, ROI video processing module 42 assumes that the content complexity of the video frames in a video sequence is uniformly distributed and thus the bits are allocated uniformly among units. Within the unit, equation (24) may used for the bit allocation among macroblocks.

In ROI video processing system 14, ROI video processing module 42 adaptively controls background skipping in a unit based on the distortion caused by the skipping ($D_{NonROI\_skip}$). For video sequences with background containing large amount of motion, the skipping of important background information may undermine ROI video coding system performance. ROI video processing module 42 uses a distortion threshold to determine the background skipping mode. The threshold may be related to $\alpha$ and the statistics of the skipping distortion of the latest processed units. By denoting $\overline{D}_n$ as the mean distortion of the latest n units, the threshold may be defined as $$\frac{\overline{D}_n}{2(1-\alpha)}.$$

ROI video processing module 42 may implement the adaptive background skipping algorithm as follows. First, ROI video processing module 42 initializes the background skipping algorithm by setting $\overline{D}_n=0$ and setting the skipping mode as ON. Then, ROI video coding module allocates the ρ budget for the current (ith) unit by:

$$\rho_{unit\,i} = \frac{\rho_{segment} - \rho_{used}}{\frac{M}{2} - i},$$

where M is the number of frames in the rate control segment, $\rho_{segment}$ is the number of ρ allocated to the segment, and $\rho_{used}$ is the number of used ρ up to the current unit within the segment. Next, within the current unit, ROI video processing module 42 allocates bits for each macroblocks by equation (24). If the skipping mode is on, then no bits are assigned for the non-ROI area of the second frame.

After the distortion for a current unit is obtained, ROI video processing module 42 updates $\overline{D}_n$ by $\overline{D}_n=(1-\eta)\overline{D}_{n-1}+\eta D_n$, where η is the learning factor and it is in the range of [0, 1]. Then ROI video processing module 42 updates the ρ statistics and gets data for the next unit. If this is the last unit, ROI video processing module 42 may terminate the algorithm. If it is not the last unit, ROI video processing module 42 calculates $D_{NonROI\_skip}$ for the new unit. If $$D_{NonROI\_skip} > \frac{\overline{D}_n}{2(1-\alpha)}$$

then ROI video processing module 42 turns off the skipping mode. Otherwise, ROI video processing module 42 repeats the above described algorithm for the new unit.

The techniques described herein may be implemented in hardware, software, firmware, or any combination thereof. If implemented in software, the techniques may be realized in part by a computer readable medium comprising program code containing instructions that, when executed, performs one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. In some embodiments, the functionality described herein may be provided within dedicated software modules or hardware units configured for automatic object segmentation, or incorporated in an automatic object segmentation system.

In this disclosure, various techniques have been described for low-complexity automatic ROI detection within a video frame of a video sequence. In some cases, the low-complexity automatic ROI detection may be based on sensor-specific characteristics. In other cases, the low-complexity automatic ROI detection may be based on motion information for the video frame and a different video frame of the video sequence. A ROI video processing system may implement one or more of the disclosed techniques individually or in combination to provide an automatically detected and accurately processed ROI for use in multimedia applications, such as video surveillance applications, VT applications, or video broadcasting applications.

The disclosed techniques include a video processing technique capable of tuning and enhancing video sensor calibration, camera processing, ROI detection, and ROI video processing within a video communication device based on characteristics of a specific video sensor. The video processing technique may be universally applicable to different types of video sensors. In this way, the disclosed techniques may enhance ROI video processing performance based on video sensor physical characteristics and statistics.

The disclosed techniques also include a sensor-based ROI detection technique that uses video sensor physical characteristics and camera processing side-information to improve ROI detection accuracy, which directly enhances ROI video processing performance. For example, a skin region detector uses video sensor statistics to accurately detect a skin map within a video frame, and a face detector uses the skin map to detect one or more faces within the video frame. The disclosed techniques also include a motion-based ROI detection technique that uses motion information obtained during motion estimation in video processing. For example, a face detector uses a skin map and the motion information, e.g., motion vectors, to perform low-complexity face detection that efficiently extracts one or more faces, i.e., ROIs, within the skin map based on the motion information. These and other embodiments are within the scope of the following claims.

The invention claimed is:

1. A method comprising:
   receiving a video frame of a video sequence from a video sensor;
   generating sensor statistics for the video sensor using skin color reflectance spectra of the video sensor;
   detecting skin regions within the video frame based on the sensor statistics;
   generating a skin map of the video frame based on the detected skin regions;
   receiving the skin map by a region of interest (ROI) detector from a skin region detector;
   receiving motion information for the video frame and a different video frame of the video sequence by the ROI detector;
   selecting an automatic ROI detection mode from at least a first ROI detection mode and a second ROI detection mode by a ROI detection controller, based on the quality of the skin map and on the sensor statistics;
   if the first ROI detection mode is selected, automatically detecting a ROI within the video frame based on locations of macroblocks in the video frame relative to the skin map of the video frame, and without reference to the motion information for the different video frame, by the ROI detector; and
   if the second ROI detection mode is selected, automatically detecting a ROI within the video frame based on locations of macroblocks in the video frame relative to the skin map of the video frame and a ROI within the different video frame by the ROI detector.

2. The method of claim 1, wherein automatically detecting the ROI within the video frame based on locations of macroblocks in the video frame relative to the skin map of the video frame and the ROI within the different video frame comprises:
   comparing a first macroblock of the video frame with a second macroblock of the different video frame corresponding to the first macroblock; and
   selecting the first macroblock as a portion of the ROI within the video frame when the second macroblock sufficiently overlaps the ROI within the different video frame and the first macroblock sufficiently overlaps the skin map of the video frame.

3. The method of claim 2, further comprising dropping the first macroblock from consideration as the portion of the ROI within the video frame when at least one of: the second macroblock does not sufficiently overlap the ROI within the different video frame or the first macroblock does not sufficiently overlap the skin map of the video frame.

4. The method of claim 1, wherein receiving motion information comprises receiving motion vectors obtained by tracking motion of the ROI between the video frame and the different video frame of the video sequence.

5. The method of claim 1, further comprising:
   receiving a skin map of another video frame of the video sequence; and
   automatically detecting, a ROI within the another video frame based on locations of macroblocks in the video frame relative to the skin map of the video frame and without reference to motion information for the another video frame and the different video frame of the video sequence.

6. The method of claim 5, wherein automatically detecting the ROI within the another video frame comprises:
   dividing the skin map into disconnected regions;
   selecting candidate regions from the disconnected regions, wherein the candidate regions include a candidate region having a largest area of the another video frame;
   detecting ROI features within the candidate regions;
   selecting one or more ROI regions from the candidate regions that include at least one of: a largest number of ROI features or the largest area of the another video frame;
   selecting ROI macroblocks from macroblocks of the another video frame that at least partially overlap with the one or more ROI regions within the another video frame; and
   generating the ROI within the another video frame based on the selected ROI macroblocks.

7. The method of claim 6, further comprising verifying the detected ROI features within the video frame to select correct features for the ROI and remove false features from the set of ROI feature candidates.

8. The method of claim 6, further comprising performing morphological operations on the one or more ROI regions to close internal holes in the skin map of the video frame from the detected ROI features.

9. The method of claim 1, further comprising processing the video frame including the automatically detected ROI, wherein processing the video frame comprises preferentially processing the automatically detected ROI within the video frame relative to non-ROI areas of the video frame.

10. The method of claim 1, further comprising encoding the video frame including the automatically detected ROI, wherein encoding the video frame comprises preferentially encoding the automatically detected ROI within the video frame relative to non-ROI areas of the video frame.

11. The method of claim 1, wherein selecting the automatic ROI detection mode comprises determining an amount of motion activity between the video frame and the different video frame of the video sequence, and selecting the first ROI detection mode when the amount of motion activity is above a pre-determined level.

12. The method of claim 1, wherein selecting the automatic ROI detection mode comprises determining a number of consecutive video frames of the video sequence in which the ROI was automatically detected in they second ROI detection mode, and selecting the first ROI detection mode when the number of consecutive second ROI detection mode video frames is above a pre-determined level.

13. A nontransitory computer readable medium comprising instructions which, when executed by a programmable processor, cause the programmable processor to:
   receive a video frame of a video sequence from a video sensor;
   generate sensor statistics for the video sensor using skin color reflectance spectra of the video sensor;
   detect skin regions within the video frame based on the sensor statistics;
   generate a skin map of the video frame based on the detected skin regions;
   receive motion information for the video frame and a different video frame of the video sequence;
   select an automatic region of interest (ROI) detection mode from at least a first ROI detection mode and a second ROI detection mode, based on the quality of the skin map and on the sensor statistics;
   if the first ROI detection mode is selected, automatically detect a ROI within the video frame based on locations of macroblocks in the video frame relative to the skin map of the video frame and without reference to the motion information for the different video frame; and
   if the second ROI detection mode is selected, automatically detect a ROI within the video frame based on locations of macroblocks in the video frame relative to the skin map of the video frame and a ROI within the different video frame.

14. The computer-readable medium of claim 13, wherein the instructions cause the programmable processor to:
   compare a first macroblock of the video frame with a second macroblock of the different video frame corresponding to the first macroblock; and
   select the first macroblock as a portion of the ROI within the video frame when the second macroblock sufficiently overlaps the ROI within the different video frame and the first macroblock sufficiently overlaps the skin map of the video frame.

15. The computer-readable medium of claim 14, further comprising instructions that cause the programmable processor to drop the first macroblock from consideration as the portion of the ROI within the video frame when at least one of: the second macroblock does not sufficiently overlap the ROI within the different video frame or the first macroblock does not sufficiently overlap the skin map of the video frame.

16. The computer-readable medium of claim 13, wherein the instructions cause the programmable processor to receive motion vectors obtained by tracking motion of the ROI between the video frame and the different video frame of the video sequence.

17. The computer-readable medium of claim 13, further comprising instructions that cause the programmable processor to:

receive a skin map of another video frame of the video sequence; and automatically detect a ROI within the another video frame based on locations of macroblocks in the video frame relative to the skin map of the video frame and without reference to motion information for the another video frame and the different video frame of the video sequence.

18. The computer-readable medium of claim 17, wherein the instructions cause the programmable processor to:

divide the skin map into disconnected regions;

select candidate regions from the disconnected regions, wherein the candidate regions include a candidate region having a largest area of the another video frame;

detect ROI features within the candidate regions;

select-one or more ROI regions from the candidate regions that include at least one of: a largest number of ROI features or the largest area of the another video frame;

select ROI macroblocks from macroblocks of the another video frame that at least partially overlap with the one of more ROI regions within the another video frame; and generate the ROI within the another video frame based on the selected ROI macroblocks.

19. The computer-readable medium of claim 18, further comprising instructions that cause the programmable processor to verify the detected ROI features within the video frame to select correct features for the ROI and remove false features from the set of ROI feature candidates.

20. The computer-readable medium of claim 18, further comprising instructions that cause the programmable processor to perform morphological operations on the one or more ROI regions to close internal holes in the skin map of the video frame from the detected ROI features.

21. The computer-readable medium of claim 13, further comprising instructions that cause the programmable processor to process the video frame including the automatically detected ROI, wherein the instructions cause the programmable processor to preferentially process the automatically detected ROI within the video frame relative to non-ROI areas of the video frame.

22. The computer-readable medium of claim 13, further comprising instructions that cause the programmable processor to encode the video frame including the automatically detected ROI, wherein the instructions cause the programmable processor to preferentially encode the automatically detected ROI within the video frame relative to non-ROI areas of the video frame.

23. The computer-readable medium of claim 13, wherein the instructions cause the programmable processor to determine an amount of motion activity between the video frame and the different video frame of the video sequence, and select the first ROI detection mode when the amount of motion activity is above a pre-determined level.

24. The computer-readable medium of claim 13, wherein the instructions cause the programmable processor to determine a number of consecutive video frames of the video sequence in which the ROI Was automatically detected in the second ROI detection mode, and select the first ROI detection mode when the number of consecutive second ROI detection mode video frames is above a pre-determined level.

25. A video processing system comprising:

at least one processor;

a camera processing module that receives a video frame of a video sequence from a video sensor;

a sensor calibration module that generates sensor statistics for the video sensor;

a skin region detector that detects skin regions within the video frame based on the sensor statistics and generates a skin map of the video frame of the video sequence based on the detected skin regions;

a region of interest (ROI) video processing module that generates motion information for the video frame and a different video frame of the video sequence;

a ROI detection controller that selects an automatic ROI detection mode from at least a first ROI detection mode and a second ROI detection mode, based on the quality of the skin map and on the sensor statistics; and a ROI detector that:

receives the skin map and the motion information for the video frame;

if the first ROI, detection mode is selected, automatically detects a ROI within the video frame based on locations of macroblocks in the video frame relative to the skin map of the video frame and without reference to the motion information for the different video frame; and if the second ROI detection mode is selected, automatically detects a ROI within the video frame based on locations of macroblocks in the video frame relative to the skin map of the video frame and a ROI within the different video frame.

26. The system of claim 25, wherein the ROI detector:

compares a first macroblock of the video frame with a second macroblock of the different video frame corresponding to the first macroblock; and selects the first macroblock as a portion of the ROI within the video frame when the second macroblock sufficiently overlaps the ROI within the different video frame and the first macroblock sufficiently overlaps the skin map of the video frame.

27. The system of claim 26, wherein the ROI detector drops the first macroblock from consideration as the portion of the ROI within the video frame when at least one of: the second macroblock does not sufficiently overlap the ROI within the different video frame or the first macroblock does not sufficiently overlap the skin map of the video frame.

28. The system of claim 26, wherein the second macroblock sufficiently overlaps the ROI within, the different video frame when more than a predetermined percentage of the area of the second macroblock overlaps the ROI of the previous video frame.

29. The system of claim 26, wherein the first macroblock sufficiently overlaps the skin map of the video frame when more than a predetermined percentage of the area of the first macroblock overlaps the skin map of the video frame.

30. The system of claim 25, wherein the ROI video processing module tracks motion of the ROI between the video frame and the different video frame of the video sequence, to generate motion vectors.

31. The system of claim 25, wherein the skin region detector generates a skin map of another video frame of the video sequence; and wherein the ROI detector receives the skin map of the another video frame and automatically detects a ROI within the another video frame based on locations of macroblocks in the video frame relative to the skin map of the video frame and without reference to motion information, for the another video frame and the different video frame of the video sequence.

32. The system of claim 31, wherein the ROI detector includes:

a region labeling module that divides the skin map into disconnected regions;

a region selection module that selects candidate regions from the disconnected region, wherein the candidate regions include a candidate region having a largest area of the another video frame;

a feature detection and verification module that detects ROI features within the candidate regions;

a ROI region selection module that selects one or more ROI regions from the candidate regions that include at least one of: a largest number of ROI features or the largest area of the another video frame; and a ROI macroblock selection module that selects ROI macroblocks from macroblocks of the another video frame that at least partially overlap with the one or more ROI regions within the another video frame, wherein the ROI detector generates the ROI within the another video frame based on the selected macroblocks.

33. The system of claim 32, wherein the feature detection and verification module verifies the detected ROI features within the video frame to select correct features for the ROI and remove false features from the set of ROI feature candidates.

34. The system of claim 32, further comprising a morphological operation module that performs morphological operations on the one or more ROI regions to close internal hole in the skin map of the video frame from the detected ROI features.

35. The system Of claim 25, wherein the ROI video processing module processes the video frame including the automatically detected ROI, wherein the ROI video processing module preferentially processes the automatically detected ROI within the video frame relative to non-ROI areas of the video frame.

36. The system of claim 25, wherein the ROI video processing module comprises a ROI video coding module that encodes the video frame including the automatically detected ROI, wherein the ROI video coding module preferentially encodes the automatically detected ROI within the video frame relative to non-ROI areas of the video frame.

37. The system of claim 25, wherein the ROI detection controller determines an amount of motion activity between the video frame and the different video frame of the video sequence, and selects the first ROI detection mode when the amount of motion activity is above a pre-determine level.

38. The system Of claim 25, wherein the ROI detection controller determines a number of consecutive video frames of the video sequence in which the ROI was automatically detected in the second ROI detection mode, and selects the first ROI detection mode when the number of consecutive second ROI detection mode video frames is above a pre-determined level.

39. A video processing system comprising:
at least one processing means;
a camera processing means that receives a video frame of a video sequence from a video sensor;
a sensor calibration means that generates sensor statistics for the video sensor;
a skin region detector means that detects skin regions within the video frame based on the sensor statistics and generates a skin map of the video frame of the video sequence based on the detected skin regions;
a region of interest (ROI) video processing means that generates motion information for the video frame and a different video frame of the video sequence;
a ROI detection controller means that selects an automatic ROT detection mode from at least a first ROT detection mode and a second ROI detection mode, based on the quality of the skin map and on the sensor statistics; and
a ROI detector means that:
receives the skin map and the motion information for the video frame;
if the first ROI detection mode is selected, automatically detects a ROI within the video frame based on locations of macroblocks in the video frame relative to the skin map of the video frame and without reference to the motion information for the different video frame; and
if the second ROI detection mode is selected, automatically detects a ROI within the video frame based on locations of macroblocks in the video frame relative to the skin map of the video frame and a ROI within the different video frame.

* * * * *